US010885786B2

(12) United States Patent
Tanaka et al.

(10) Patent No.: US 10,885,786 B2
(45) Date of Patent: Jan. 5, 2021

(54) MANAGEMENT CONTROL DEVICE AND ON-BOARD COMMUNICATION TERMINAL DEVICE

(71) Applicant: HITACHI CONSTRUCTION MACHINERY CO., LTD., Tokyo (JP)

(72) Inventors: Wataru Tanaka, Tokyo (JP); Masaki Kanai, Tokyo (JP); Tomoyuki Hamada, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 184 days.

(21) Appl. No.: 16/328,938

(22) PCT Filed: Sep. 15, 2017

(86) PCT No.: PCT/JP2017/033595
§ 371 (c)(1),
(2) Date: Feb. 27, 2019

(87) PCT Pub. No.: WO2018/056231
PCT Pub. Date: Mar. 29, 2018

(65) Prior Publication Data
US 2019/0244524 A1 Aug. 8, 2019

(30) Foreign Application Priority Data

Sep. 23, 2016 (JP) ................................. 2016-185132

(51) Int. Cl.
*G08G 1/16* (2006.01)
*G05D 1/02* (2020.01)
*G08G 1/0968* (2006.01)

(52) U.S. Cl.
CPC ............... *G08G 1/164* (2013.01); *G05D 1/02* (2013.01); *G05D 1/0214* (2013.01);
(Continued)

(58) Field of Classification Search
CPC ............. G08G 1/164; G08G 1/096827; G08G 1/096877; G05D 1/02; G05D 1/0297; G05D 1/0214; G05D 2201/021; G05D 1/0289
See application file for complete search history.

(56) References Cited

U.S. PATENT DOCUMENTS 5,897,595 A * 4/1999 Hawkins .............. G05D 1/0297
340/909
5,925,081 A * 7/1999 Hawkins .............. G05D 1/0297
701/24
(Continued)

FOREIGN PATENT DOCUMENTS

| JP | 2000-339029 A | 12/2000 |
| JP | 2016-071568 A | 5/2016 |
| WO | 2016/056677 A1 | 4/2016 |

OTHER PUBLICATIONS

International Search Report of PCT/JP2017/033595 dated Nov. 18, 2017.

*Primary Examiner* — Mussa A Shaawat
(74) *Attorney, Agent, or Firm* — Mattingly & Malur, PC

(57) ABSTRACT

A protected region is set for a manned working machine, said region including a first protected region in which new protected region setting request information is not transmitted and which includes the position of the manned working machine, and a second protected region which is set along a periphery of the first protected region and in which new protected region setting request information is transmitted. An area occupied by the vehicle body of the manned working machine on a plane projected on the ground surface is calculated on the basis of vehicle body information indicating the size of the vehicle body of the manned working machine and position information thereof. When the occupied area is present within the first protected region,
(Continued)

new protected region setting request information is not transmitted, whereas when the occupied area is present within the second protected region, protected region setting request information is transmitted.

7 Claims, 19 Drawing Sheets

(52) U.S. Cl.
CPC ..... *G05D 1/0297* (2013.01); *G08G 1/096827* (2013.01); *G08G 1/096877* (2013.01)

(56) References Cited

U.S. PATENT DOCUMENTS

| | | | | |
|---|---|---|---|---|
| 5,956,250 | A * | 9/1999 | Gudat | G05D 1/027 701/26 |
| 6,246,932 | B1 * | 6/2001 | Kageyama | G05D 1/0297 340/992 |
| 6,393,362 | B1 * | 5/2002 | Burns | G05D 1/0278 340/940 |
| 6,625,540 | B2 | 9/2003 | Kageyama | |
| 6,799,100 | B2 * | 9/2004 | Burns | G05D 1/0297 340/436 |
| 7,885,766 | B2 * | 2/2011 | Sugimoto | G08G 1/167 701/301 |
| 8,022,663 | B2 * | 9/2011 | Davis | H02J 7/345 320/104 |
| 8,840,190 | B2 * | 9/2014 | Stokes | E21C 41/30 299/1.9 |
| 8,954,241 | B2 * | 2/2015 | Ruth | G05D 1/0225 701/50 |
| 9,420,203 | B2 * | 8/2016 | Broggi | G01S 17/86 |
| 9,766,637 | B2 * | 9/2017 | Kou | B60K 31/00 |
| 2007/0293996 | A1 * | 12/2007 | Mori | G01C 21/005 701/23 |
| 2010/0063954 | A1 * | 3/2010 | Anderson | G05D 1/0221 706/50 |
| 2016/0121904 | A1 * | 5/2016 | Prakah-Asante | B60W 50/08 701/1 |
| 2017/0145663 | A1 * | 5/2017 | Hiranaka | E02F 9/205 |
| 2017/0221354 | A1 * | 8/2017 | Povey | H04L 67/00 |
| 2017/0351264 | A1 * | 12/2017 | Ruokojarvi | G05D 1/0246 |

* cited by examiner

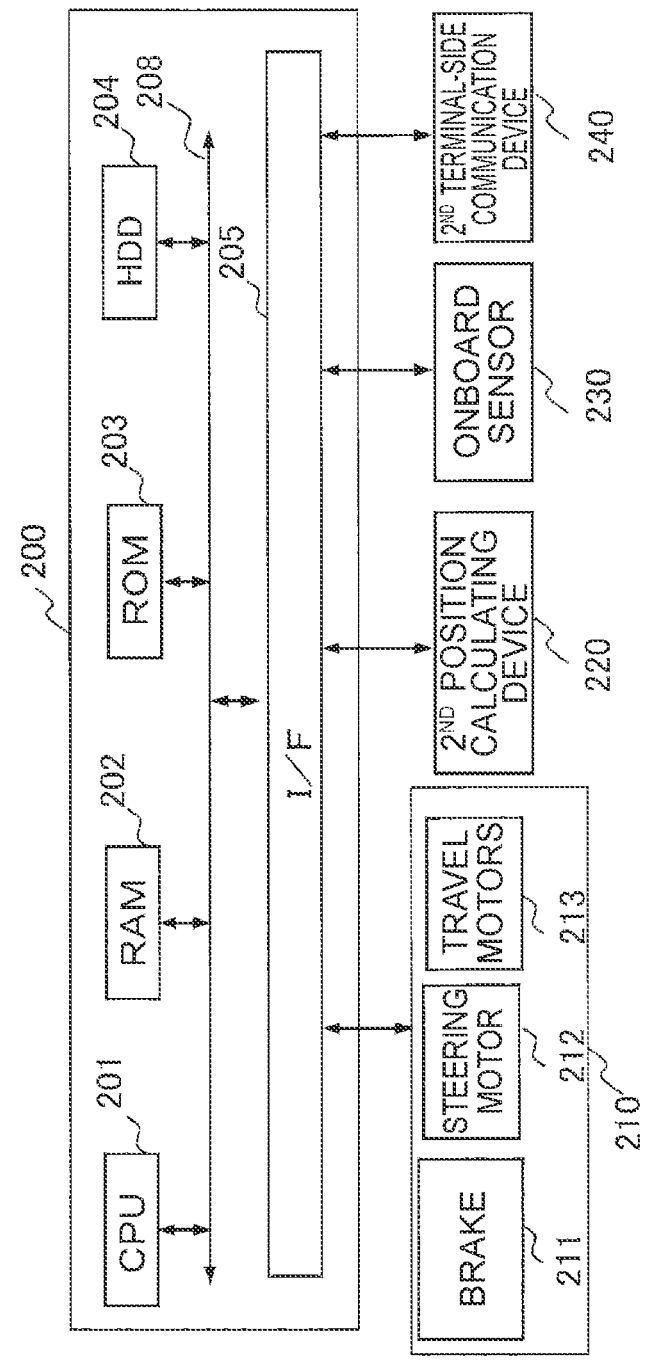

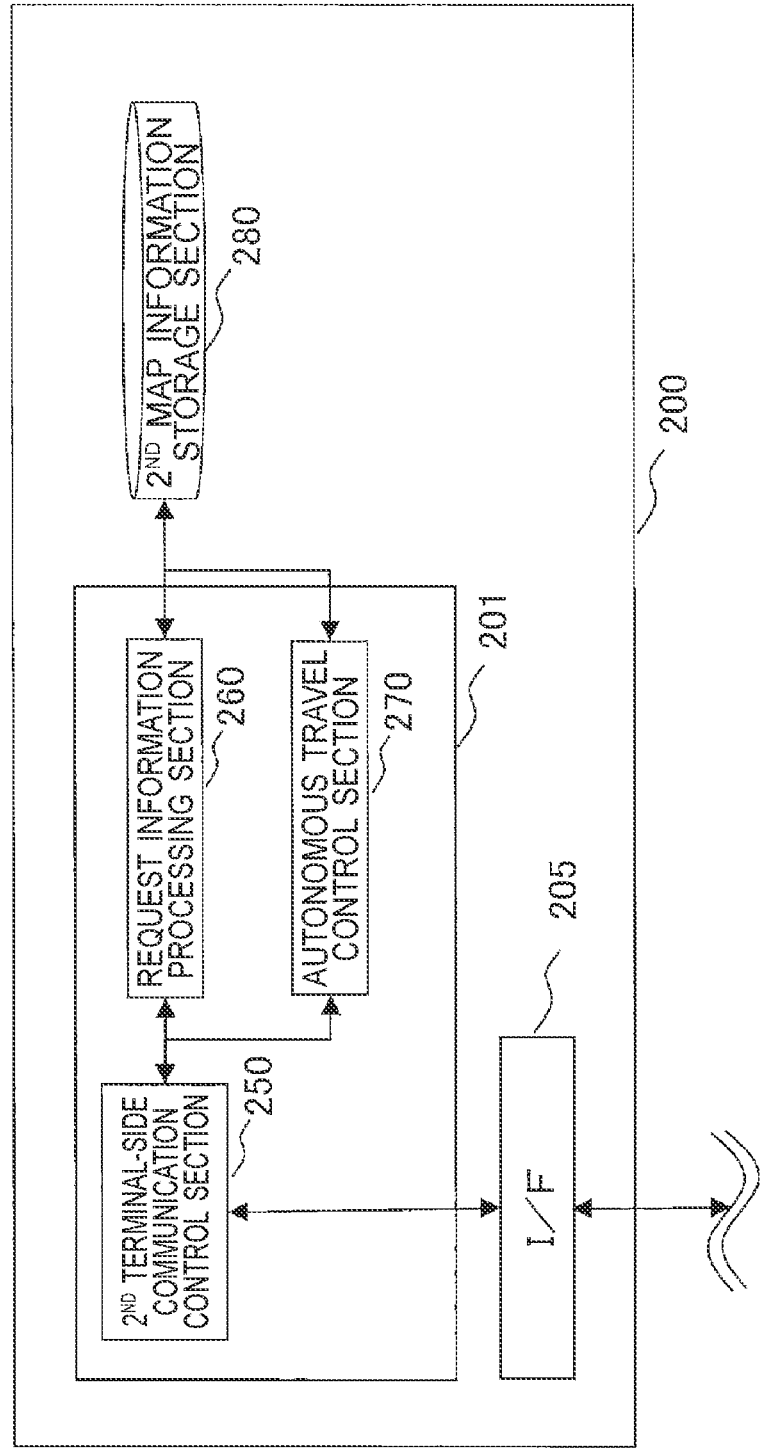

FIG. 6

| COORDINATES OF CENTER POINT | RADIUS OF 1ST PROTECTED REGION | RADIUS OF 2ND PROTECTED REGION | RADIUS OF 3RD PROTECTED REGION | SHAPES OF PROTECTED REGIONS | VEHICLE ID | VEHICLE TYPE | SPEED | WORK MODE |
|---|---|---|---|---|---|---|---|---|
| (X1,Y1) | r1-101 | w2-101 | w3-101 | CONCENTRIC CIRCLES | 90 | BULLDOZER | v1 | GRADING |

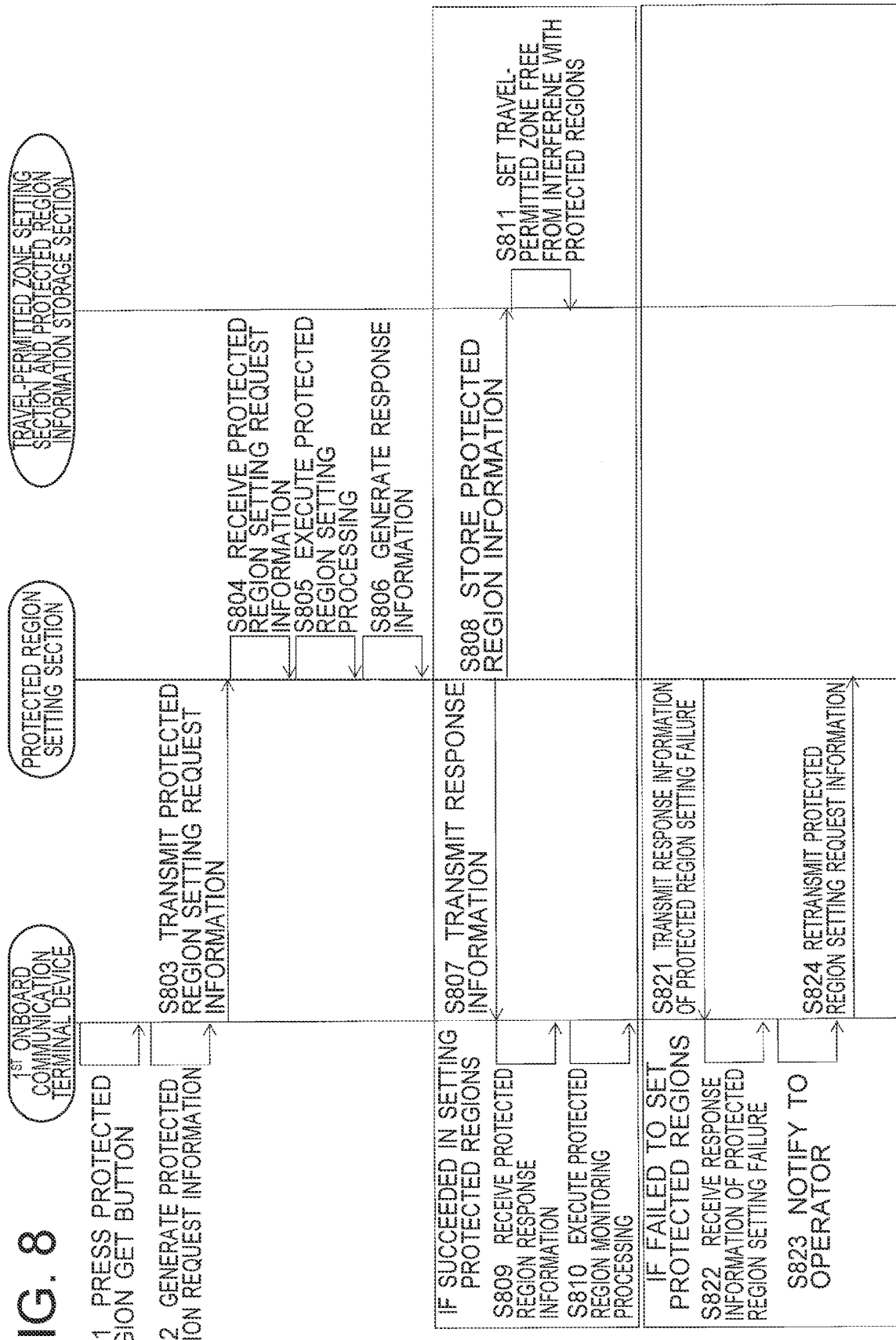

MANAGEMENT CONTROL DEVICE AND ON-BOARD COMMUNICATION TERMINAL DEVICE

TECHNICAL FIELD

This invention relates to a traffic control device and an onboard communication terminal device, and especially to a traffic control technology at a work site where autonomous traveling vehicles and manned vehicles travel together.

BACKGROUND ART

In a surface mine or the like, autonomous traveling working machines, such as dump trucks that autonomously travel without an operator onboard, and manned vehicles that travel under operation by operators, such as bulldozers, graders and sprinkler vehicles, may travel together.

As a technology for preventing interference between an autonomous traveling working machine and a manned vehicle, Patent Document 1 discloses the following configuration: "An unmanned vehicle uses the latest position data for a manned vehicle acquired (received) via an inter-vehicle communication device to determine a position (position at a certain point in time) as the basis for computing a circle having this position as its center and having a radius equal to the distance traveled at maximum speed from this point to a predetermined future point in time, and designates the area within this circle on a prearranged travel route as a range of possible locations for the manned vehicle. The unmanned vehicle then decides whether its own vehicle position interferes with this circle. (Excerpt of the abstract)".

PRIOR ART DOCUMENT

Patent Document

Patent Document 1: U.S. Pat. No. 6,625,540 A

DISCLOSURE OF THE INVENTION

Problem to be Solved by the Invention

To avoid a collision of an autonomous traveling working machine with a manned vehicle, a traffic control device or the autonomous traveling working machine needs to acquire information on the existing position of the manned vehicle and, if there is a risk of collision, to make a deceleration or a stop. In addition, the existing position information needs to be updated as required because the manned vehicle travels. If the traffic control device and the autonomous traveling working machine frequently conduct communications with many manned vehicles existing in a mine, however, a potential problem may arise in that available wireless communication bands may be tightened, adverse effects may be exerted on other communications such as transmission and reception of autonomous travel commands to and from the autonomous traveling working machine, and the efficiency of production may hence be deteriorated.

With the vehicle interference prevention device described in Patent Document 1, it is possible to decrease the frequency of communications by estimating the existing range of a manned vehicle based on an elapsed time. However, the estimated existing range of the manned vehicle increases as time goes on and, whenever determined that the autonomous travelling working machine may proceed into the estimated existing range, the autonomous travelling working machine decelerates or stops and hence a problem arises in that the efficiency of production at the mine is deteriorated.

The present invention has been developed to resolve the above-described problems, and has as an object thereof the provision of a technology that can perform prevention of interference between of an autonomous traveling working machine and a manned working machine in response to changes in the position of the manned working machine while minimizing effects on wireless communication and a restriction to an operating area of the autonomous traveling working machine.

Means for Solving the Problems

It is an aspect of the present invention to resolve the above-described problems by a traffic control device comprising a computer connected to a center-side communication device; the center-side communication device being a wireless communication device that conducts transmission and reception of wireless communication information with each of a first onboard communication terminal device mounted on a first manned working machine, which travels under operation by a first operator, and a second onboard communication terminal device mounted on an autonomous traveling working machine which autonomously travels according to a control command from the traffic control device, that receives, from the first onboard communication terminal device, information on a protected region setting request, which requests setting of a protected region for the first manned working machine to avoid interference with the autonomous traveling working machine, and information on a position of the first manned working machine, and that transmits the control command to the second onboard communication terminal device; the traffic control device being provided with a traffic control map information storage section that stores information on a map of a haul road on which the autonomous traveling working machine and the first manned working machine travel, and a protected region setting section that, when the center-side communication device receives the protected region setting request information, sets, as a protected region for the first manned working machine, a region, in which the position of the first manned working machine is included and into which intrusion of the autonomous traveling working machine is prohibited, based on the map information and the position information received from the first onboard communication terminal device; the protected region including a first protected region, which includes the position of the first manned working machine, and a second protected region, which is set along a periphery of the first protected region; the first protected region being a region in which the first onboard communication terminal device does not transmit new protected region setting request information; the second protected region being a region in which the first onboard communication terminal device transmits new protected region setting request information; the protected region setting section being configured to output response information, which indicates positions of the first and second protected regions set responsive to the protected region setting request information, to the center-side communication device; and the response information being transmitted to the first onboard communication terminal device via the center-side communication device.

Advantageous Effects of the Invention

According to the present invention, it is possible to provide a technology that can perform a prevention of interference between of an autonomous traveling working machine and a manned working machine in response to changes in the position of the manned working machine while minimizing effects on wireless communication and a restriction to an operating area of the autonomous traveling working machine. Problems, configurations and advantageous effects other than those described above will become apparent from the following description of embodiments.

BRIEF DESCRIPTION OF THE DRAWINGS

FIG. 2B is a hardware configuration diagram of a dump truck.

FIG. 4A is a functional block diagram depicting functions of a second onboard communication terminal device.

FIG. 6 is a table showing an example of information on the protected regions.

FIG. 8 is a diagram depicting a sequence of processing at the first onboard communication terminal device and traffic control device.

MODES FOR CARRYING OUT THE INVENTION

Embodiments of the present invention will hereinafter be described in detail based on the drawings. Throughout the drawings that describe or illustrate the embodiments, members having the same functions are identified by the same or related designations, and their repeated descriptions will be omitted. It is also to be noted that in the following embodiments, the description of the same or similar parts will not be repeated as a general rule unless specifically needed.

First Embodiment

Figure 1:
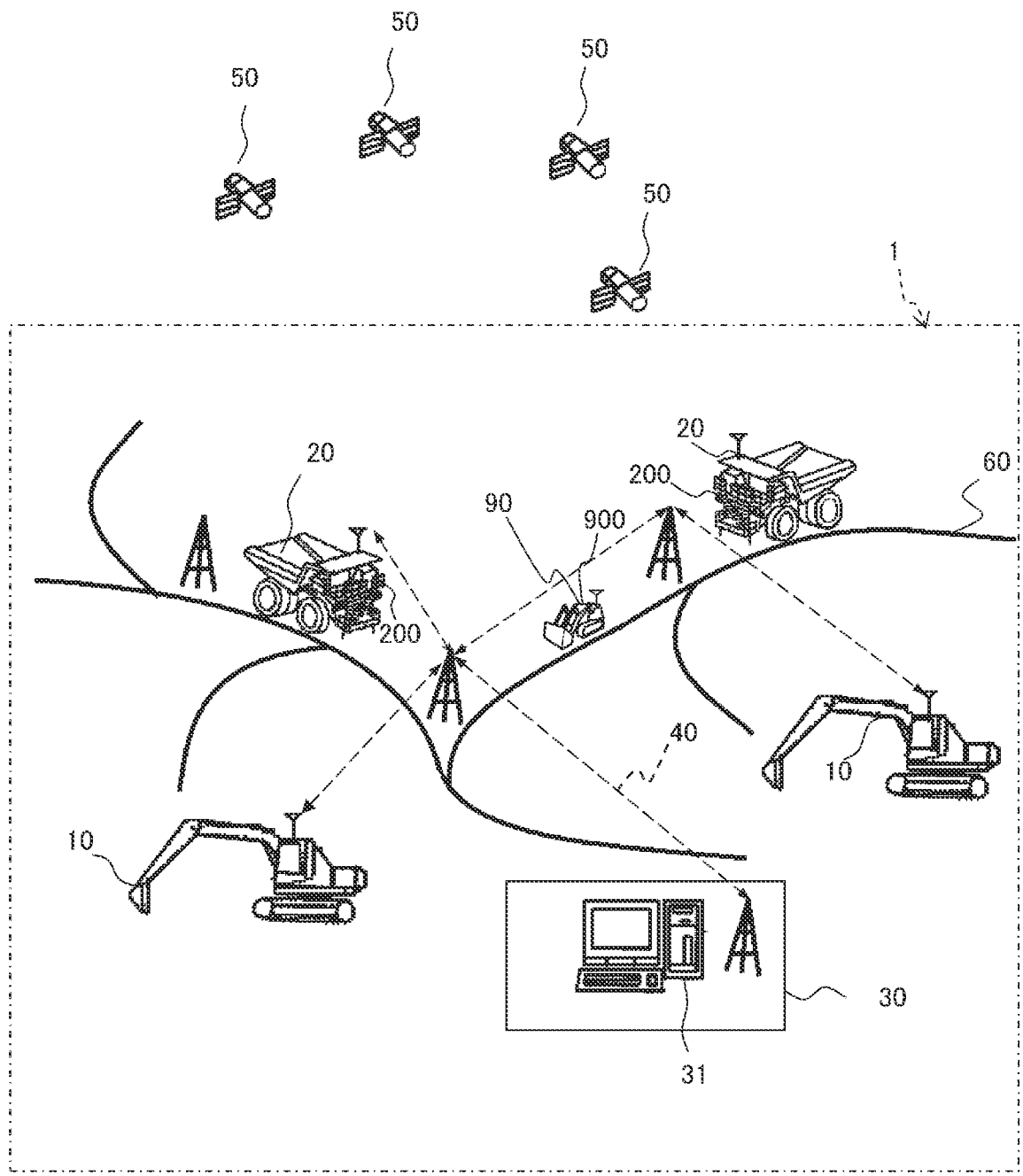
FIG. 1 is a view illustrating the schematic configurations of a traffic control system.

Based on FIG. 1, a description will first be made about the schematic configurations of an autonomous traveling system including a traffic control device 31 according to the present invention. FIG. 1 is a view illustrating the schematic configurations of a traffic control system 1.

The traffic control system 1 illustrated in FIG. 1 is configured by connecting second onboard terminal devices 200 and a first onboard communication terminal device 900 to the traffic control device 31 for communications via wireless communication network 40. The second onboard terminal devices 200 are mounted on dump trucks 20 (which correspond to autonomous traveling working machines) each of which carries a payload such as rock, ore or the like loaded from excavators 10 that perform digging and loading work at a quarry such as amine and autonomously travels on a haul road 60. The second onboard terminal devices 200 receive traffic control commands from the traffic control device 31, and perform autonomous travel control according to the traffic control commands. The first onboard communication terminal device 900 is mounted on a first manned working machine 90 (which will be described taking a bulldozer as an example) which an operator is onboard. The traffic control device 31 is installed at a traffic control center 30 near or remote from the quarry. In the foregoing, the autonomous traveling working machines are not limited to the dump trucks, and can also be autonomously traveling haul vehicles, sprinkler vehicles or the like without any limitation imposed on their type. Similarly, the manned working machine is not limited to the bulldozer, and can also be a grader, a light vehicle or the like without any limitation imposed on its type.

The excavators 10, dump trucks 20 and the first manned working machine 90 are each mounted with a global positioning system (GPS) that receives signals from GPS satellites 50 and calculates the position, and each transmit information on the calculated position to the traffic control device 31. The GPS is an example of a position calculating device, and the position calculating device may be configured as a device that conducts a correction on an output from the GPS by using an output from an inertial measurement unit (IMU).

Figure 2A:
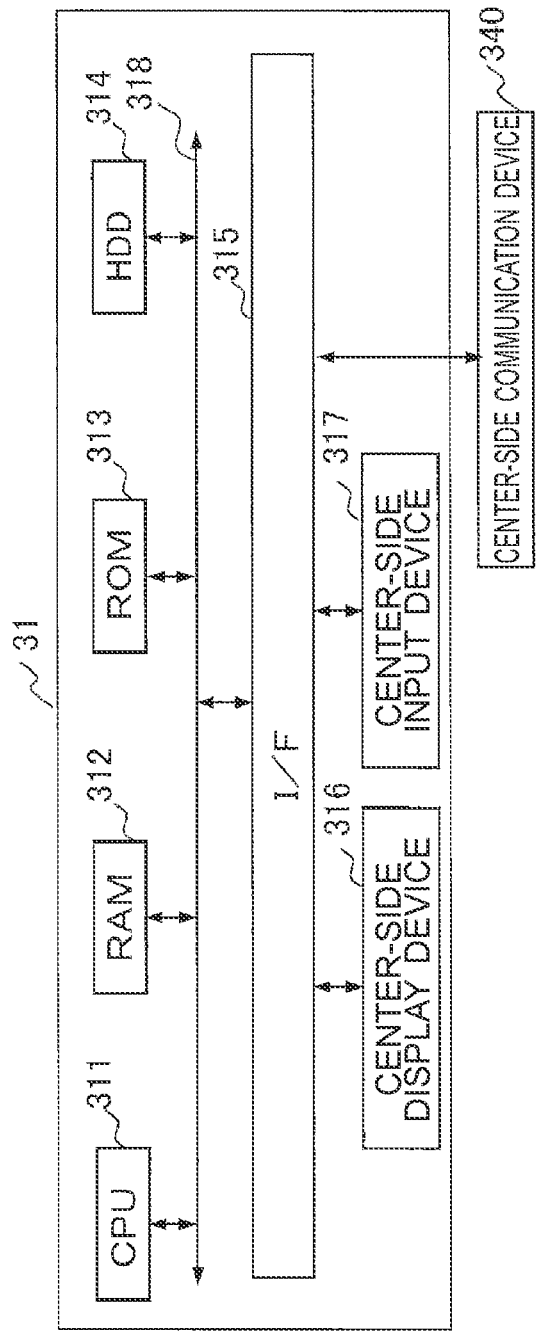
FIG. 2A is a hardware configuration diagram of a traffic control device.
Figure 2C:
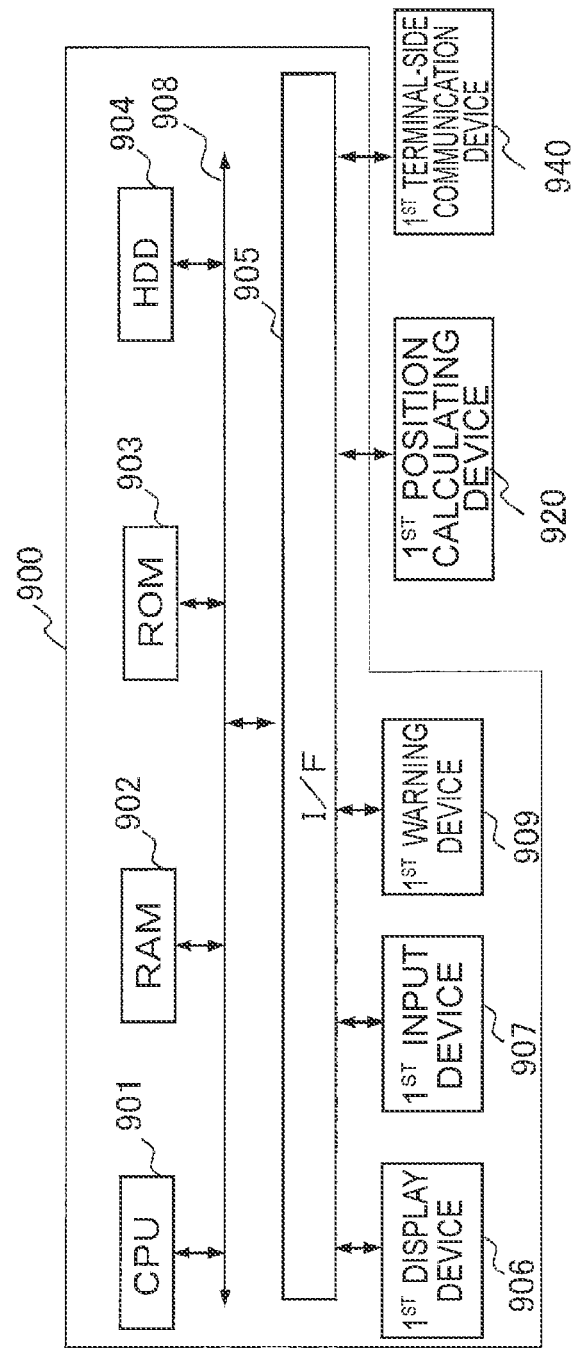
FIG. 2C is a hardware configuration diagram of a first manned working machine.

Referring next to FIGS. 2A, 2B and 2C, a description will be made about the hardware configurations of the traffic control device 31, dump trucks 20 and first manned working vehicle 90 of FIG. 1. FIG. 2A is a hardware configuration diagram of the traffic control device 31, FIG. 2B is a hardware configuration diagram of the dump trucks 20, and FIG. 2C is a hardware configuration diagram of the first manned working machine 90.

As depicted in FIGS. 2A, 2B and 2C, the traffic control device 31, second onboard communication terminal device 200 and first onboard communication terminal device 900 are configured of computers including CPUs 311,201,901, random access memories (RAMS) 312,202,902, read only memories (ROMs) 313,203,903, hard disk drives (HDDs) 314,204,904, I/Fs 315,205,905, and buses 318,208,908, respectively. These CPUs 311,201,901, RAMs 312,202,902, ROMs 313,203,903, HDDs 314,204,904 and I/Fs 315,205, 905 are connected together via the buses 318,208,908, respectively. This configuration example of the computers is merely illustrative, and the computers may have a configuration formed of a combination of integrated circuits.

The traffic control device 31 is also provided with a center-side display device 316 and a center-side input device 317, which are connected to the I/F 315. A center-side communication device 340 is connected to the I/F 315 for a connecting the traffic control device 31 to the wireless communication network 40.

As depicted in FIG. 2B, connected to the I/F 205 of the second onboard communication terminal device 200 are a travel drive system 210 for driving the dump truck 20, that is, for allowing the dump truck 20 to travel, a second position calculating device 220, an onboard sensor 230, such as a millimeter wave sensor, for detecting surrounding environments of the dump truck 20, and a second terminal-side communication device 240 for connection to the wireless communication network 40. The center-side communication device 340 and second terminal-side communication device 240 are wireless communication devices which conduct transmission and reception of wireless communication information via the wireless communication network 40.

The travel drive system 210 includes a braking system 211 for applying a brake to the dump truck 20, a steering motor 212 for changing the steering angle of the dump truck 20, and travel motors 213 for allowing the dump truck 20 to travel.

As depicted in FIG. 2C, the first onboard communication terminal device 900 includes a first display device 906 that displays a navigation image, a first input device 907 that accepts input operation (which includes protected region request operation) from the first operator who is operating the first manned working machine 90, and a first warning device 909 that notifies an approach to or from any other vehicle, all of which are connected to the I/F 905. Furthermore, a first position calculating device 920 and a first terminal-side communication device 940 are also connected to the I/F 905.

Figure 3:
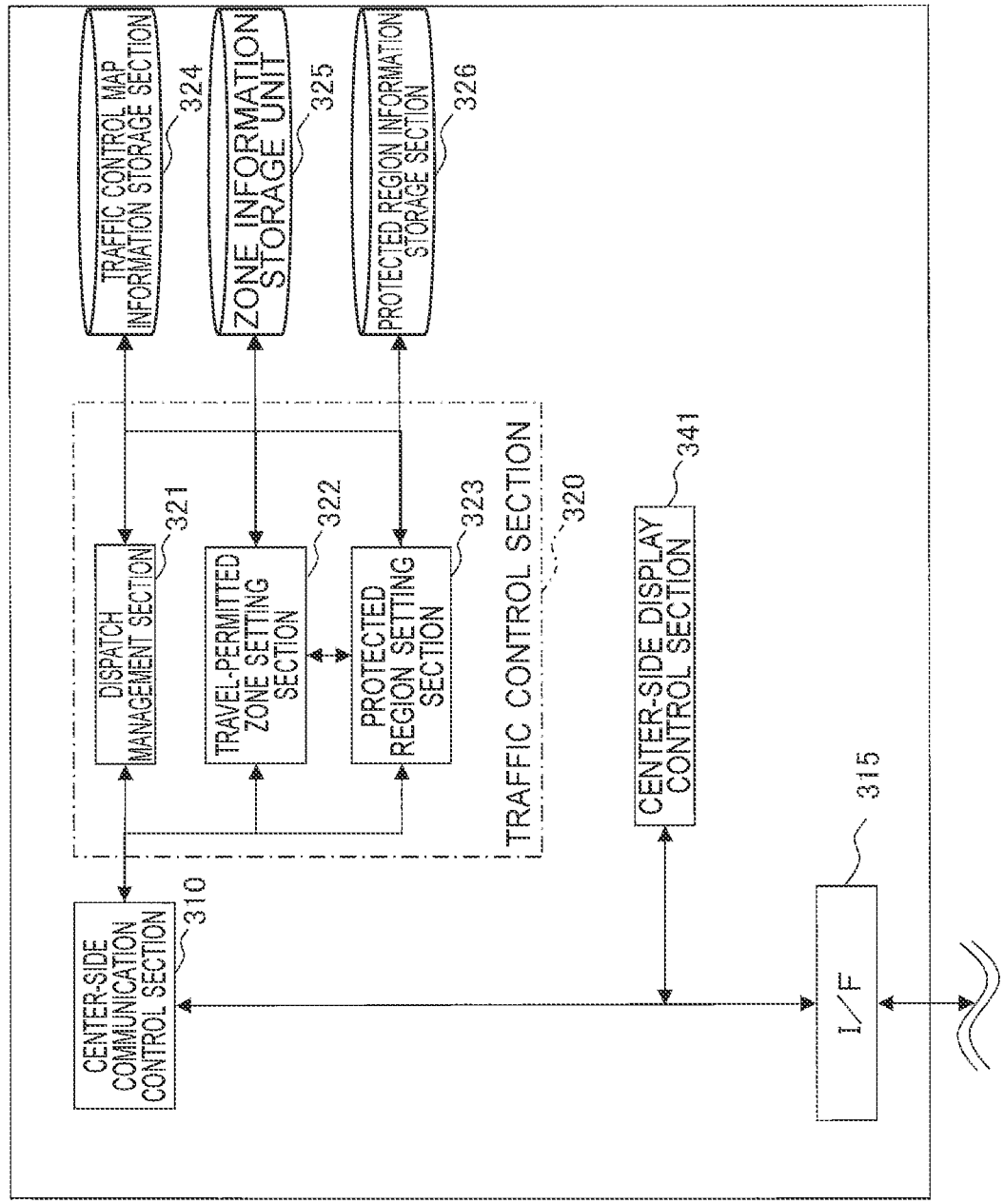
FIG. 3 is a functional block diagram depicting principal functions of the traffic control device.
Figure 4B:
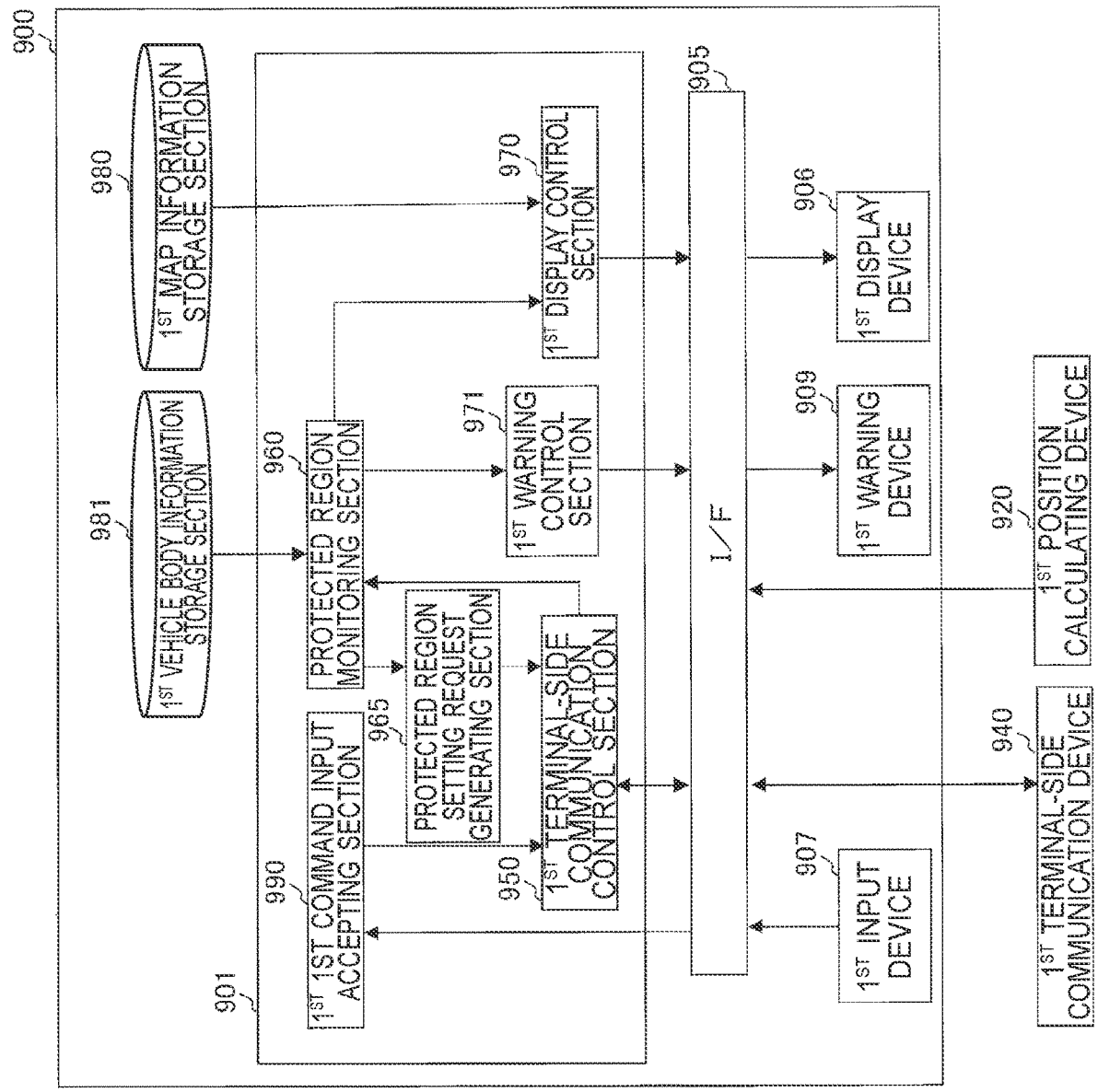
FIG. 4B is a functional block diagram depicting functions of a first onboard communication terminal device.
Figure 4C:
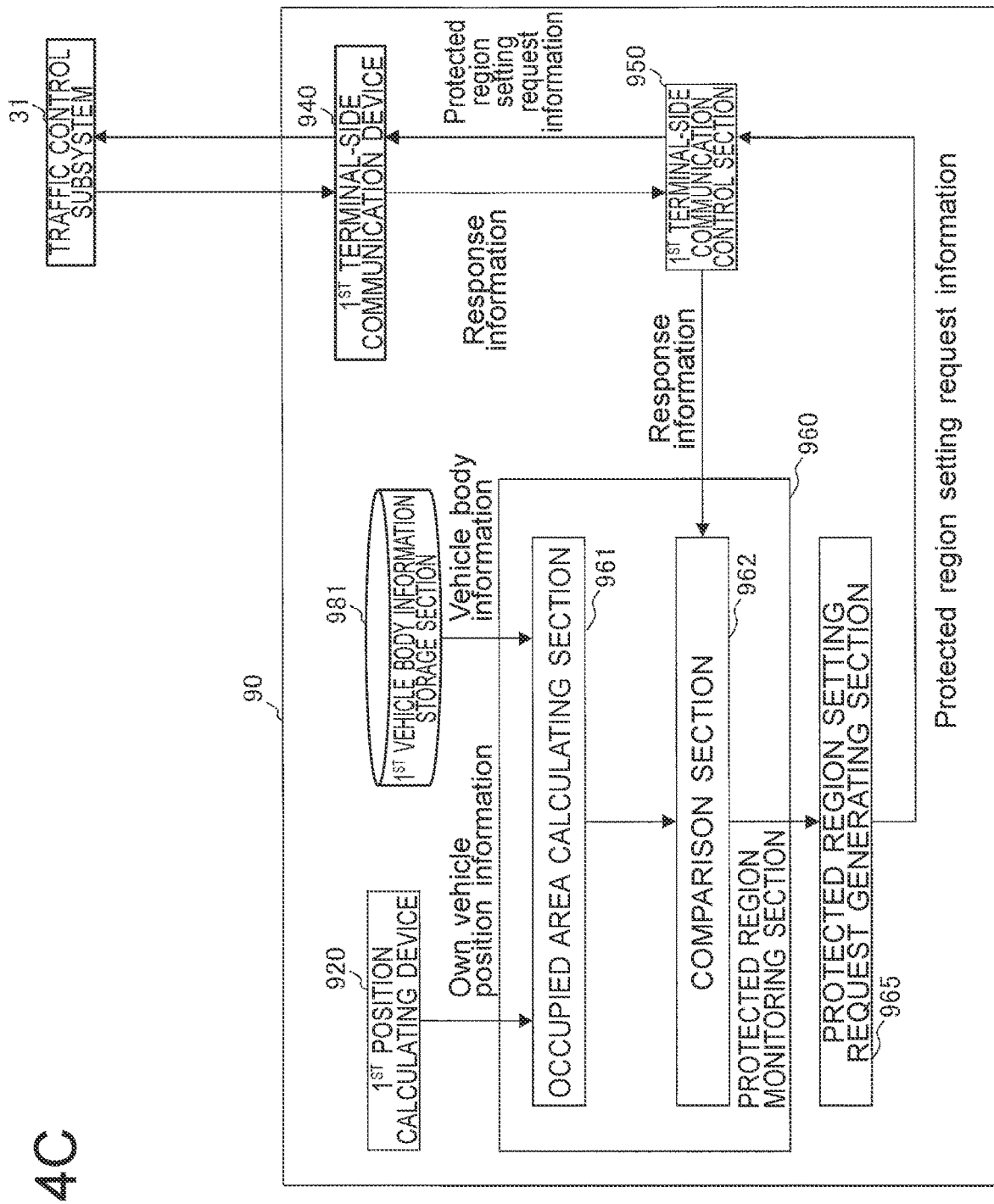
FIG. 4C is a functional block diagram depicting details of a protected region monitoring section.

Referring next to FIGS. 3, 4A, 4B and 4C, a description will be made about the functional configurations of the traffic control device 31, the dump truck 20 and the first manned working machine 90. FIG. 3 is a functional block diagram depicting principal functions of the traffic control device. FIG. 4A is a functional block diagram depicting functions of the second onboard communication terminal device 200. FIG. 4B is a functional block diagram depicting functions of the first onboard communication terminal device 900. FIG. 4C is a functional block diagram depicting details of the protected region monitoring section 960.

As depicted in FIG. 3, the traffic control device 31 includes a center-side communication control section 310, a traffic control section 320, a traffic control map information storage section 324, a zone information storage section 325, and a protected region information storage section 326. The center-side communication control section 310 performs control to conduct wireless communications with the dump truck 20 and first manned working machine 90. The traffic control section 320 determines a destination for the dump truck 20 and a travel route to the destination, and performs traffic control to avoid interference between dump trucks themselves or between the dump truck 20 and the first manned working machine 90. The traffic control map information storage section 324 stores information on a map of the haul road 60. The zone information storage section 325 stores information on the position of a travel-permitted zone which has been set. The protected region information storage section 326 stores information on the setting of protected regions (which may hereinafter also be called simply "the protected region setting information") set according to a request from the first manned working machine 90.

The center-side communication control section 310 is connected to the center-side communication device 340 via the I/F 315, and performs control to conduct actual wireless communication with the dump truck 20 and the first manned working machine 90 respectively.

The traffic control section 320 includes a dispatch management section 321, a travel-permitted zone setting section 322, and a protected region setting section 323.

The dispatch management section 321 sets a destination for the dump truck 20, and determines a travel route from the current position to the destination with reference to the map information on the haul road 60 as stored in the traffic control map information storage section 324.

As an example of processing by the dispatch management section 321, if the dump truck 20 is at a work site such as a loading site or dumping site 61 (see FIG. 14) or a parking area, for example, the dispatch management section 321 sets a travel route from an entrance of the work site to a dynamic moving stop position by following movements of the stop position.

The travel-permitted zone setting section 322 sets a partial zone of a travel lane of the dump truck 20 on the haul road 60 as a travel-permitted zone with a travel permission granted to the dump truck 20 only. The travel-permitted zone setting section 322 also updates the zone information, which has been stored in the zone information storage section 325, by overwriting it with the positional information that indicates the position of the travel-permitted zone.

The travel-permitted zone setting section 322 permits only the dump truck 20 to travel in the partial zone which is a part of the travel route of the dump truck 20, and sets the partial zone as a travel-permitted zone which prohibits intrusion of other dump trucks and manned working machines. In other words, the travel-permitted zone functions as a zone closed to other vehicles.

Upon setting the travel-permitted zone, the travel-permitted zone setting section 322 refers to the zone information and protected region setting information. The travel-permitted zone, which is to be set for the vehicle that has transmitted the zone request information on the travel-permitted zone, is set so that it overlaps neither the travel-permitted zone set for another dump truck 20 nor the protected regions set for the first manned working machine 90. As a consequence, the dump truck 20 and first manned working machine 90 do not exist in the same travel-permitted zone at the same time, so that vehicles can avoid interfering with each other.

Upon reception of the protected region setting request information from the first manned working machine 90, the protected region setting section 323 sets regions, which include the position of the first manned working machine 90, as protected regions for the first manned working machine 90 based on at least one of vehicle type, position, speed, work mode and the like of the first manned working machine 90, and stores the regions in the protected region information storage section 326. The protected regions include at least a first protected region 101 (see FIG. 7) and a second protected region 102 (see FIG. 7). In the first protected region 101, at least the first manned working machine 90 transmits no protected region setting request information to the traffic control device 31. The second protected region 102 is set along a periphery of the first protected region 101. In the second protected region 102, the first manned working machine 90 transmits protected region setting request information to the traffic control device 31 to request setting of new protected regions. In addition, a third protected region 103 (see FIG. 7) may also be set along a periphery of the second protected region 102. In the third protected region 103, a warning is issued to the first operator when the first manned working machine 90 has proceeded from the second protected region 102.

Figure 12:
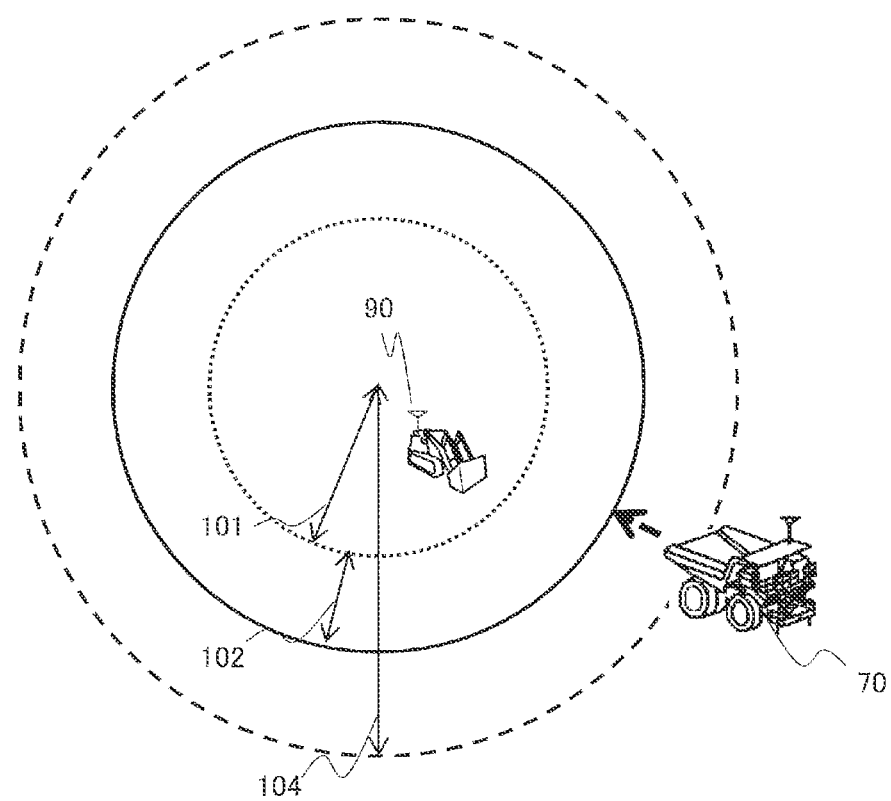
FIG. 12 is an explanatory diagram showing a positional relationship between protected regions for the first manned working machine and the second manned working machine.

As shown in FIG. 12, the protected region setting section 323 may also set an intrusion warning section 104 to warn the second operator, who is operating a second manned working machine 70 different from the first manned working machine 90, that the second manned working machine 70 is approaching close to the first protected region and second protected region set for the first manned working machine 90. This mode will be described in a second embodiment.

A center-side display control section 341 performs control to display, on the screen of the center-side display device 316, the positions of the dump truck 20 and first manned working machine 90 traveling on the haul road 60, the setting conditions of the protected regions for the first manned working machine 90, and the travel-permitted zone set for the dump truck 20.

As depicted in FIG. 4A, the second onboard communication terminal device 200 mounted on the dump truck 20 is provided with a second terminal-side communication control section 250, a request information processing section 260, an autonomous travel control section 270, and a second map information storage section 280.

The second terminal-side communication control section 250 performs control of wireless communications to be conducted with the traffic control device 31. The second terminal-side communication control section 250 performs the transmission of zone request information and the reception of zone response information or non-permission response information.

The request information processing section 260 generates, based on the map information stored in the second map information storage section 280 and the position calculated by the second position calculating device 220 (see FIG. 2B), zone request information to make a setting request for a new travel-permitted zone when the dump truck 20 has reached a request point set beforehand near an end of the travel-permitted zone set for the own vehicle, and transmits the zone request information to the traffic control device 31 via the second terminal-side communication control section 250.

The autonomous travel control section 270 acquires the own vehicle position from the second position calculating device 220, and with reference to the map information in the second map information storage section 280, performs control on the travel drive system 210 (see FIG. 2B) to allow the own vehicle to travel according to the travel-permitted zone contained in the zone response information. Further, the autonomous travel control section 270 determines the existence or non-existence of a front obstacle based on a detection result by the onboard sensor 230, determines a need or no need for evasive operation from interference or collision with the obstacle, and if necessary, performs control for braking operation. Furthermore, according to instructions from the traffic control device 31, the autonomous travel control section 270 also performs drive control on the travel drive system 210.

As depicted in FIG. 4B, the first onboard communication terminal device 900 is provided with a first terminal-side communication control section 950, a protected region monitoring section 960, a protected region setting request information generating section 965, a first display control section 970, a first warning control section 971, a first map information storage section 980, a first vehicle body information storage section 981, and a first command input accepting section 990.

The first terminal-side communication control section 950 performs control on the transmission of position information and protected region setting request information to the traffic control device 31 and control on the reception of response information or failure information.

As depicted in FIG. 4C, the protected region monitoring section 960 includes an occupied area calculating section 961 and a comparison section 962. Upon projection of the vehicle body of the own vehicle on a plane assumed to be a ground surface, the occupied area calculating section 961 calculates, based on the position information and vehicle body information, the size of an occupied area, which a projected image so obtained occupies on the plane, and absolute positions of at least two representative points in the occupied area. It is to be noted that with the position information on only one representative point in the occupied area, a change in the direction of the occupied area cannot be ascertained because the direction of the occupied area changes as the first manned working machine 90 travels. As the minimum, there is hence a need for positional information on two points as representative points. These two points may be located, for example, on a front end and a rear end of the vehicle. Processing for the calculation of the absolute positions of the representative points by the occupied area calculating section 961 will be described subsequently herein.

The comparison section 962 compares the position of the occupied area with each of the position of the first protected region 101 and the position of the second protected region 102. If any part of the occupied area departs from the first protected region 101, the comparison section 962 determines that the first manned working machine 90 has departed from the first protected region 101. In this embodiment, the first manned working machine 90 is determined to have departed from the first protected region 101 if any part of the occupied area departs from the first protected region 101, and the first manned working machine 90 is determined to have departed from the second protected region 102 if any part of the occupied area departs from the second protected region 102. As an alternative, if the occupied area departs in its entirety from the first protected region 101 or the second protected region 102, the comparison section 962 may determine that the first manned working machine 90 has departed from the first protected region 101 or the second protected region 102, respectively. As a further alternative, if the occupied area departs in its entirety from the first protected region 101, the comparison section 962 may determine that the first manned working machine 90 has departed from the first protected region 101 and, even if the occupied area departs at a part thereof from the second protected region 102, the comparison section 962 may still determine that the first manned working machine 90 has departed from the second protected region 102. Conditions for the determination of a departure may be changed, as needed, depending on the level of desired safety, the degree of congestion around the first manned working machine 90, the distance to the dump truck 20, and so on. When determined to have departed, the comparison section 962 outputs comparison results, which indicate the departure, to the protected region setting request information generating section 965.

Based on the comparison results indicating that the first manned working machine 90 has departed from the first protected region 101, the protected region setting request information generating section 965 transmits information on a new protected region setting request.

The first display control section 970 displays an image of the haul road 60, on which the first manned working machine 90 travels, and a working area on the first display device 906 by using the information in the first map information storage section 980, and also displays, in superimposition on the image of the haul road and working area, position information on the protected regions set for the first manned working machine 90 and the position information on other vehicles, both of these position information having been received from the traffic control device 31, and the current position of the first manned working machine 90 as calculated by the first position calculating device 920. While looking at the protected regions and current position for and of the first manned working machine 90 as displayed on the first display device 906, the first operator performs traveling of the first manned working machine 90 so that the first manned working machine 90 does not travel off from the protected regions.

Based on the position information on the protected region set for the first manned working machine 90 as received from the traffic control device 31 and the current position of the first manned working machine 90 as calculated by the first position calculating device 920, the first warning control section 971 determines whether the first manned working machine 90 has reached a point (a warning region for the first manned working machine 90), where a warning should be issued, in the protected regions. If determined to have reached, a warning is issued to the first operator by sound, light or the like from the first warning device 909, or warning information is displayed on the first display device 906.

The first command input accepting section 990 accepts an operation in which the operator who is onboard the first manned working machine 90 operates the first input device 907 to designate a destination for the first manned working machine 90 or to designate the work mode of work which the operator is to perform. Upon acceptance of a protected region setting request operation, the first command input accepting section 990 also generates protected region setting request information, and outputs it to the first terminal-side communication control section 950.

As a configuration for the avoidance of interference between the first manned working machine 90 and the dump truck 20, the operation relating to protected regions to be set for the first manned working machine 90 will be described.

Figure 5A:
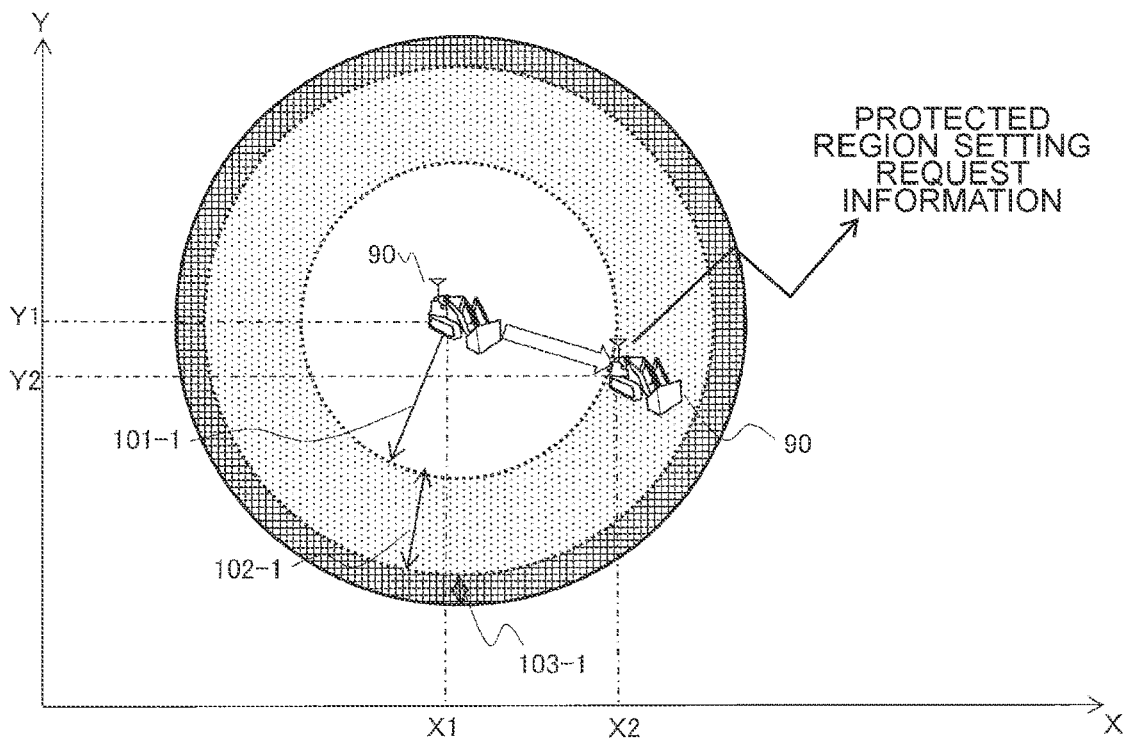
FIG. 5A is a view showing protected regions set for an initial position of the first manned working machine.
Figure 5B:
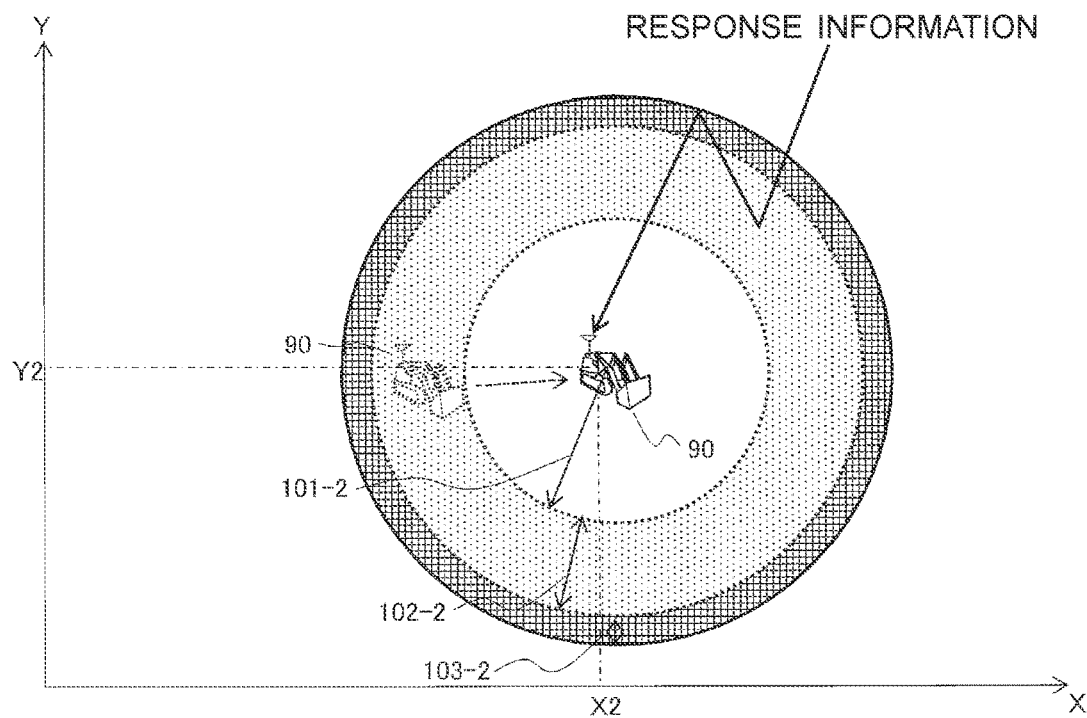
FIG. 5B is a view showing protected regions updated and set following a movement of the first manned working machine.

Firstly, by using FIGS. 5A, 5B and 6, examples of a configuration of the protected regions to be set for the first manned working machine 90 and their updating method will be described. FIG. 5A is a view showing protected regions set for an initial position of the first manned working machine 90. FIG. 5B is a view showing protected regions updated and set following a movement of the first manned working machine 90. FIG. 6 is a table showing an example of information on the protected regions.

As shown in FIG. 5A, when the first manned working machine 90 has transmitted protected region setting request information, the traffic control device 31 sets a first protected region 101-1 including the position of the first manned working machine 90 as received most recently, a second protected region 102-1 along a periphery of the first protected region 101-1 and a third protected region 103-1 along a periphery of the second protected region 103-1, all for the first manned working machine 90.

The first protected region 101-1 is a region for which the protected region monitoring section 960 generates no protected region setting request information as long as the first manned working machine 90 exists inside the region.

The second protected region 102-1 is a region for which the protected region monitoring section 960 generates protected region setting request information to the traffic control device 31 if the first manned working machine 90 proceeds to the region.

The third protected region 103-1 is a region for which the first warning control section 971 issues, by using the first warning device 909 or the first display device 906, a warning to the first operator to the effect that the first manned working machine 90 has a potential problem of proceeding outside of the third protected region 103-1 if the first manned working machine 90 proceeds further. In this example, the third protected region 103-1 is set on an outer boundary of the second protected region 102-1, but the third protected region 103-1 may be set in an overlapping manner with the second protected region 102-1.

Shown in FIG. 5A are protected regions set responsive to the transmission of first protected region setting request information from the first manned working machine 90 at a position indicated by (X1,Y1) in the topocentric coordinate (X-Y) system. New protected region setting request information is not transmitted while the first manned working machine 90 is traveling inside the first protected region 101-1. In this case, the transmission of position information via wireless communication network can be omitted because it is unnecessary from the viewpoint of update setting of the protected regions to transmit the position information to the traffic control device 31.

If the first manned working machine 90 travels to (X2,Y2) in the second protected region, the protected region setting request information is transmitted from the first manned working machine 90 to the traffic control device 31.

In FIG. 5B, the protected region setting section 323 of the traffic control device 31 receives the protected region setting request information from the first manned working machine 90, and sets new protected regions, more specifically a first protected region 101-2, a second protected region 102-2 and a third protected region 103-2 (hereinafter, regions having similar attributes will be collectively called "first protected region 101", "second protected region 102" and "third protected region 103") for the first manned working machine 90, centering around (X2,Y2). The traffic control device 31 then transmits response information, which indicates these protected regions, to the first manned working machine 90, and the first manned working machine 90 receives them.

As the first protected region 101 is a region in which the first manned working machine 90 can travel without transmitting any protected region setting request information, the first protected region 101 is set so that it is located at the innermost among the protected regions to be set for the first manned working machine 90 and the position of the first manned working machine 90 immediately after updating the protected regions falls within the first protected region 101.

The second protected region 102 is a region to which the first manned working machine 90 proceeds before proceeding to an outside of all the protected regions (the regions including all of the first protected region 101, second protected region 102 and third protected region 103) currently set for the first manned working machine 90 and in which the first manned working machine 90 transmits the protected region setting request information. The second protected region 102 is, therefore, set to along the outer circumference of the first protected region 101.

Further, the third protected region 103 is a region to which the first manned working machine 90 travels immediately before it travel off from all the protected regions and in which a warning is issued to the first operator, so that the third protected region 103 is set to be located outermost among all the protected regions. In addition, the third protected region 103 may overlap the second protected region 102.

In this example, the protected regions are set in the shape of concentric circles centering around the position at which the first manned working machine 90 transmitted the protected region setting request information. In the case of such a shape, protected region information, which specifies the coordinates of the center point (which correspond to the position of the first manned working machine 90 when the setting request for protected regions was made) and the shape of each protected region, including its radius at start and its width, may be stored in the protected region information storage section 326 as shown in FIG. 6. The shape of each protected region may be changed depending on at least one of vehicle type, speed and work mode of the first manned working machine 90. Further, the protected region information may include information (vehicle ID) that specifically identifies the first manned working machine 90 as a target for which the protected regions have been set, and its vehicle type, speed, and work mode.

The shapes of the respective protected regions are not limited to concentric circles, but oval regions or polygonal regions may also be used, as needed, depending on the vehicle body attribute and work attribute, such as vehicle type, speed, and work mode, of the first manned working machine 90.

It is not absolutely necessary to use the position of the first manned working machine 90 as the center of the updated protected regions. If the first manned working machine 90 is a bulldozer or the like that is performing grading work, for example, the first manned working machine 90 is relatively slow in traveling speed and performs frequent changes in direction. Accordingly, concentric circular protected regions may be set centering around the position of the first manned working machine 90 as in the above-described example.

If the first manned working machine 90 is a bulldozer, light vehicle or the like that is continuously traveling toward a distant place, on the other hand, the first manned working machine 90 is relatively fast in traveling speed and does not perform frequent changes in direction. Accordingly, oval protected regions having a major radius in the proceeding direction may be set. For reducing the updating frequency of the protected regions in the above-described setting, the protected regions may be set so that they have an oval or rectangular shape, the major axis of the oval shape or the major center line of the rectangular shape coincides with the proceeding direction axis of the first manned working machine 90, and the position of the first manned working machine 90 in each protected region is shifted rearward in the proceeding direction. As a consequence, it is possible to ensure a longer travel region compared with the travel region available when the position of the first manned working machine 90 is located at the center of each protected region. As a consequence, a reduction can be expected in the load on wireless communications by delaying the timing of transmission of next protected region setting request information.

As the protected regions for the first manned working machine 90, the first protected region 101, second protected region 102 and third protected region 103 are set in this example. However, the protected regions may be those having different attributes from the first protected region 101, second protected region 102 and third protected region 103. The protected regions may include, for example, a region such as a region in which the frequency of transmission of protected region setting request information is increased, a region in which a warning is issued to the first operator in a different kind of warning manner, a region in which a warning is issued to another vehicle, or a region in which an automatic brake included in the first manned working machine 90 is actuated.

Figure 7:
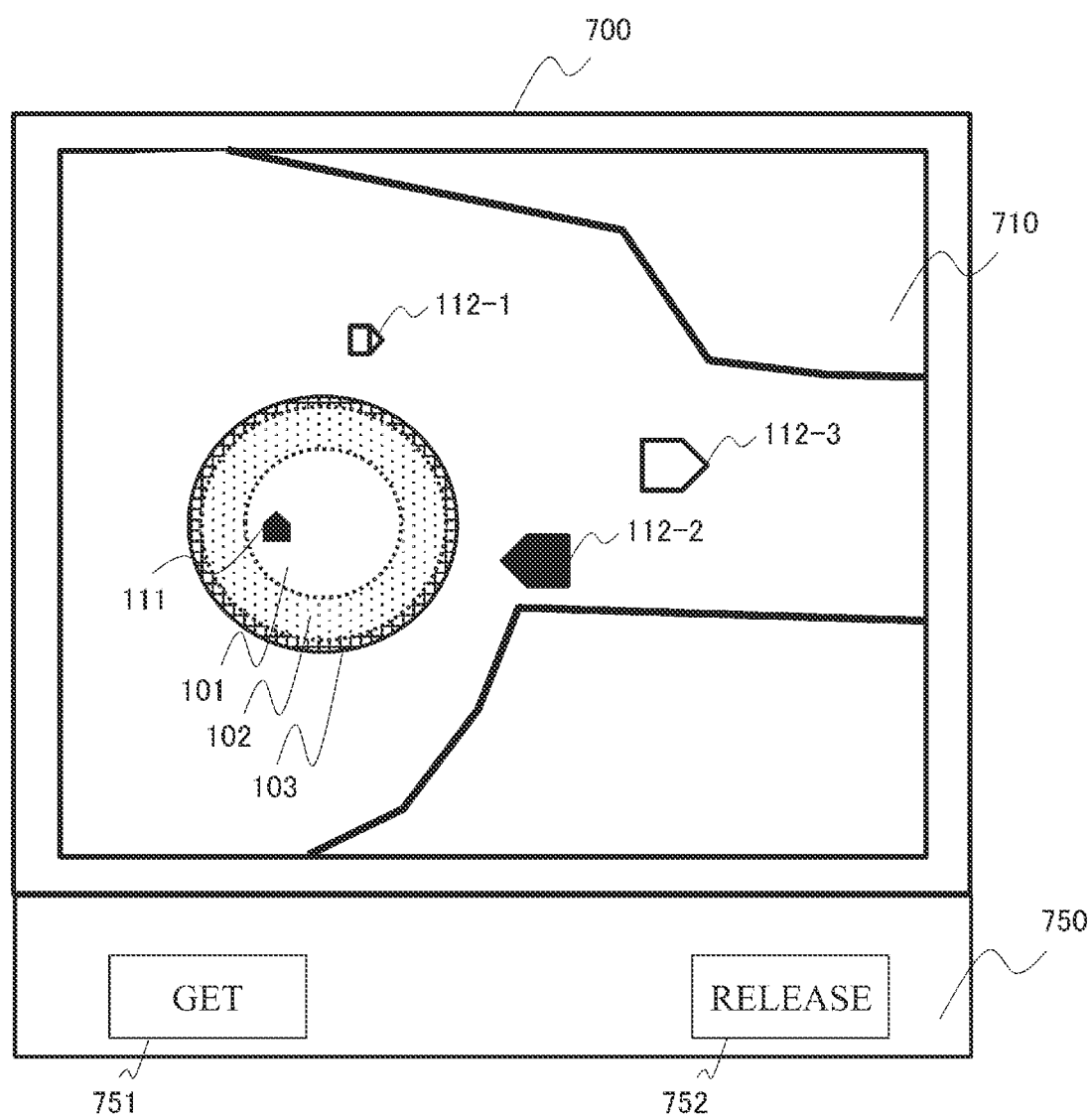
FIG. 7 is a view showing an illustrative screen display of a first onboard communication terminal device.

Next, with reference to FIG. 7, a description will be made about an illustrative screen display of the first display device 906 included in the first manned working machine 90. FIG. 7 is a view showing the illustrative screen display of the first onboard communication terminal device 900.

As shown in FIG. 7, a display screen 700 of the first onboard communication terminal device 900 includes a map display area 710 in which map information is displayed, and a button display area 750 in which buttons are displayed.

In the map display area 710, the position 111 (hereinafter called "the own vehicle position 111") of the first manned working machine 90, on which the first onboard communication terminal device 900 is mounted, as calculated by the first position calculating device 920 and the first protected region 101, second protected region 102 and third protected region 103 contained in the response information and set for the first manned working machine 90 are displayed in superimposition on an image based on the map information stored in the first map information storage section 980.

Further, other vehicle positions 112-1,112-2,112-3 (hereinafter collectively referred to as "the other vehicle positions 112") or the like acquired from the traffic control device 31 or by vehicle-to-vehicle communication are also displayed. With reference to the own vehicle position 111 and protected regions so displayed, the first operator can ascertain in which protected region and where the own vehicle is located. Among the protected regions, the first protected region 101, second protected region 102 and third protected region 103 may be displayed in different colors. If the first protected region, second protected region and third protected region are displayed in green, yellow and red, respectively, by imitating the colors of a traffic light, for example, this display is useful for the first operation in determining whether the first manned working machine 90 is located at a safe place, specifically on an inner side in the protected regions. Further, the other vehicle positions 112 may be displayed in different colors or shapes depending on the types of the other vehicles. In addition, although not shown in the figure, it may also be configured to display travel-permitted zones and protected regions set for the other vehicles and to indicate to the operator places where the other vehicles may travel.

In a lower part of the screen, a protected region get button 751 and a protected region release button 752 are arranged. If the protected region get button 751 is pressed, protected region setting request information is transmitted. Until the protected region release button 752 is pressed, the setting of protected regions for the own vehicle is continuously performed. Described specifically, if the first manned working machine 90 travels from the first protected region 101 to the second protected region 102, protected region setting request information is transmitted from the first onboard communication terminal device 900 even if the operator does not press the protected region get button 751 again.

If the protected region release button 752 is pressed, release request information for releasing the protected region information set for the own vehicle is transmitted to the traffic control device 31. The traffic control device 31 releases the protected regions set for the first manned working machine 90, and the first onboard communication terminal device 900 stops the automatic transmission of protected region setting request information.

Using FIG. 8 next, a description will be made about a flow of processing by a traffic control method according to this embodiment for the working machine. FIG. 8 is a diagram depicting a sequence of processing at the first onboard communication terminal device 900 and traffic control device 31.

If the operator presses the protected region get button 751 in the first onboard communication terminal device 900 (S801), the first command input accepting section 990 generates protected region setting request information (S802), and transmits it to the traffic control device 31 via the first terminal-side communication control section 950 (S803).

In this example, the first command input accepting section 990 is configured to acquire position information from the first position calculating device 920 via the I/F 905, and to transmit the protected region setting request information together with the position information added thereto. In a system that periodically transmits position information to the traffic control device 31, however, the latest one of the periodically-transmitted position information may also be used for the setting processing of protected regions. In this case, the addition of the position information to the protected region setting request information is not required.

The protected region setting section 323 receives the protected region setting request information via the center-side communication control section 310 (S804).

Responsive to the protected region setting request information acquired in S803, the protected region setting section 323 executes protected region setting processing for the first manned working machine 90 (S805). Details of the protected region setting processing will be described subsequently herein.

If the protected regions have been successfully set, the protected region setting section 323 generates response information containing information that indicates the set protected regions so set (for example, position information on outer boundaries that define the first protected region 101, second protected region 102 and third protected region 103) (S806), and communicates it back as response information to the first onboard communication terminal device 900.

At the same time, the protected region setting section 323 stores the set protected region information in the protected region information storage section 326 (S808). If the travel-permitted zone setting section 322 sets a new travel-permitted zone, the travel-permitted zone setting section 322 refers to the protected region information in the protected region information storage section 326, and sets the new travel-permitted zone so that it does not interfere with the protected regions which have already been set (S811). As a consequence, it is possible to prevent interference between the first manned working machine 90 and the dump truck 20 in the protected regions.

The first onboard communication terminal device 900 receives the response information from the protected region setting section 323 (S809). Then, the protected region monitoring section 960 monitors whether the first manned working machine 90 has departed from the protected regions, and also executes so-called protected region monitoring processing, in which an update request is made on the protected regions, as needed following a movement (S810).

If the protected region setting section 323 cannot set protected regions in above-described S805, on the other hand, the protected region setting section 323 transmits back failure information that indicates failure of the setting (S821).

If the failure information is received (S822), the first onboard communication terminal device 900 displays it accordingly on the first display device 906 to notify it to the operator (S823). After a predetermined period of time, the first onboard communication terminal device 900 retransmits protected region setting request information (S824). Subsequently, processing from step S804 onward will be executed.

Figure 9A:
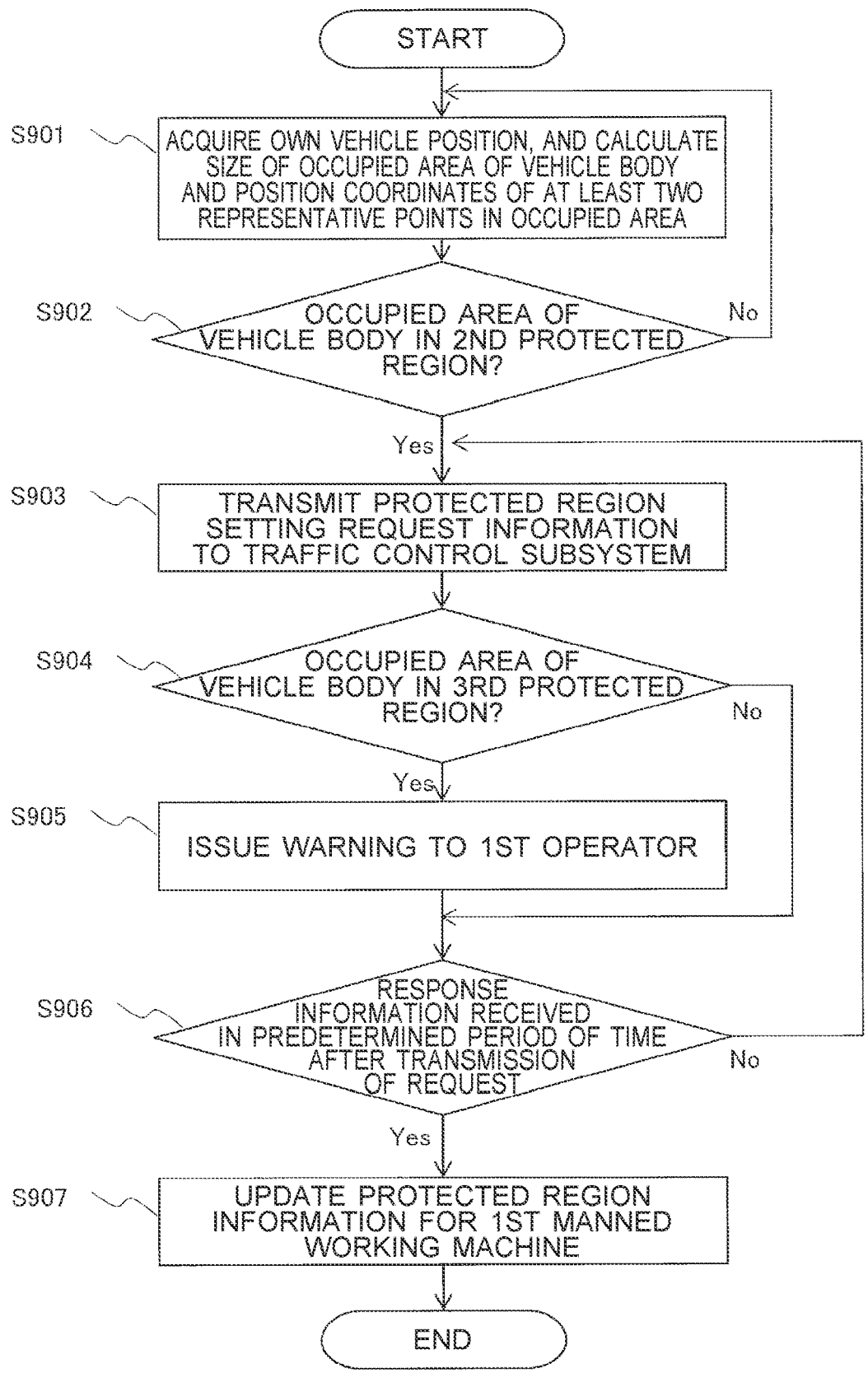
FIG. 9A is a flow chart illustrating a flow of protected region monitoring processing.
Figure 9B:
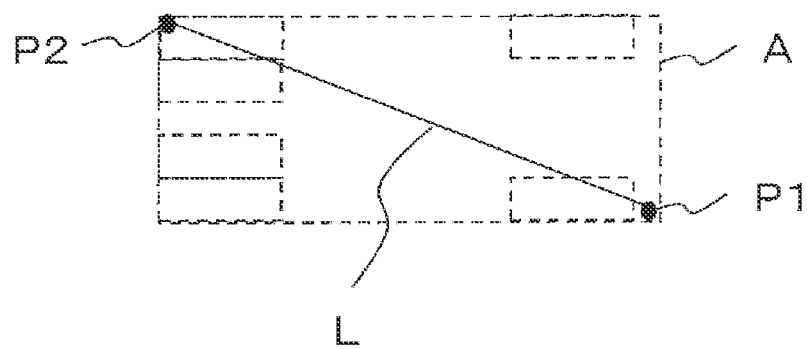
FIG. 9B is an explanatory diagram of occupied area calculation processing.

Referring to FIGS. 9A and 9B, a description will be made of a flow of the protected region monitoring processing at the first onboard communication terminal device 900. FIG. 9A is a flow chart illustrating the flow of the protected region monitoring processing. FIG. 9B is an explanatory diagram of occupied area calculating processing.

If at the first onboard communication terminal device 900, the protected region get button 751 is pressed (S801) and the response information is received (S806), the occupied area calculating section 961 calculates the size of an occupied area of the own vehicle and the positions of at least two representative points in the occupied area based on the current position of the first manned working machine 90 as calculated by the first position calculating device 920 and the vehicle body information, such as vehicle body length and width, on the first manned working machine 90 as stored beforehand in the first vehicle body information storage section 981 (S901).

In view of errors in the position information and vehicle body information, this occupied area may be set greater than a range in which the vehicle body actually exists.

A description is now made about a calculation example of the occupied area. The position information that the occupied area calculating section 961 has acquired from the first position calculating device 920 consists of absolute coordinates along three orthogonal axes of (x,y,z) as determined by defining a reference position on the vehicle body (if there are two GPS antennas, for example, their midpoint may be used) in the global coordinate system. If the relative coordinates of a representative point to the reference position is known, the absolute coordinates of the representative point can, therefore, be determined by adding the relative coordinates of the representative point to the absolute coordinates of the reference position.

Hence, the first vehicle body information storage section 981 stores beforehand representative point calculating information which is to be used for converting the reference position on the vehicle body to the position of the representative point. By defining a vehicle body coordinate system that has, as a u-axis, the height direction of the vehicle body and, as an s-axis and a t-axis, orthogonal two axes in the form of a plane with the u-axis extending as a normal vector thereto, the representative point calculating information may be defined as coordinates (s,t,u) of the representative point, which indicates the position of the representative point with the origin of the vehicle body coordinate system being assumed to be the reference position.

If the position information is acquired from the first position calculating device 920, the occupied area calculating section 961 calculates the absolute coordinates of the representative point in accordance with the following formula (1):

$$\begin{bmatrix} s_g \\ t_g \\ u_g \end{bmatrix} = R^{-1}\left(R\begin{bmatrix} x \\ y \\ z \end{bmatrix} + q + \begin{bmatrix} s \\ t \\ u \end{bmatrix}\right) - q \qquad (1)$$

where $(s_g, t_g, u_g)$ are the absolute coordinates of the representative point, R is a rotation matrix from the absolute coordinates to the vehicle body coordinates, and q is a parallel translation vector from the absolute coordinates to the vehicle body coordinates.

If as depicted in FIG. 9B, there are two representative points, for example, a first representative point P1 on a front right part of the vehicle body and a second representative point P2 on a rear left part of the vehicle body, the first vehicle body information storage section 981 stores beforehand representative point calculating information on each of the first representative point P1 and second representative point P2, and the occupied area calculating section 961 calculates the absolute coordinates of each of the first representative point P1 and second representative point P2. The occupied area calculating section 961 calculates, as the occupied area, a rectangular region A that has, as a diagonal, a line segment L connecting the first representative point P1 and the second representative point P2 together.

As the definition of the occupied area, it is described as "Upon projection of the vehicle body of the own vehicle on a plane assumed to be a ground surface, . . . an occupied area" in the foregoing. However, the occupied area may be represented in terms of an area, which is to be occupied upon projection of the vehicle body on a ground surface, by determining, as parameters indicating the occupied area, only biaxial coordinates (s,t) out of the coordinates (s,t,u) of the representative point without actually executing the projection processing to the ground surface. In other words, after the calculation of the formula (1), the absolute coordinates $(s_g, t_g)$ of the representative point on the absolute coordinate system may be used directly as the occupied area.

The comparison section 962 determines whether the occupied area of the vehicle body is overlapping the second protected region 102 (S902). If not overlapping with the second protected region 102 (S902/No), the own vehicle exists in the first protected region 101 when the response information has been received. This means that the own vehicle has not departed from the first protected region 101 at that time point. Therefore, the processing returns to S901.

If there are plural representative points, the comparison section 962 may now determine, based on a departure of at least one representative point but departures of not all the representative points, that at least a part of the occupied area has departed. If all the representative points have departed, the comparison section 962 may then determine that the occupied area has departed in its entirety.

As another example of this step, the comparison section 962 may determine whether the occupied area of the vehicle body is overlapping with the first protected region 101 and, only if not overlapping, may determine whether the occupied area of the vehicle body is overlapping with the second protected region 102. If the occupied area of the vehicle body is overlapping with the first protected region 101, the comparison section 962 further continues a comparison between the occupied area and the first protected region 101.

If overlapping with the second protected region 102 (S902/Yes), the protected region setting request information generating section 965 generates protected region setting request information, and the first terminal-side communication control section 950 transmits the protected region setting request information to the traffic control device 31 (S903). Here, the latest position information may also be transmitted in addition to the protected region setting request information.

Next, the comparison section 962 determines whether the occupied area of the vehicle is overlapping with the third protected region 103 (S904). If overlapping with the third protected region (S904/Yes), the first warning control section 971 actuates the first warning device 909 to issue a warning to the first operator to the effect that there is a potential problem of traveling off from the protected region (S905). In addition, a warning may also be displayed to that effect on the first display device 906.

If not overlapping the third protected region 103 (S904/No), nothing is executed and the processing proceeds to the next step.

Subsequently, if no response information is received in a predetermined period of time after the transmission of the protected region setting request information (S906/No), the processing returns to S903 and the protected region setting request information is transmitted again to the traffic control device 31.

If response information can be received in the predetermined period of time (S906/Yes), the protected region monitoring section 960 updates the protected regions, which the first manned working machine 90 stores, to new protected regions contained in the response information (S907).

Figure 10:
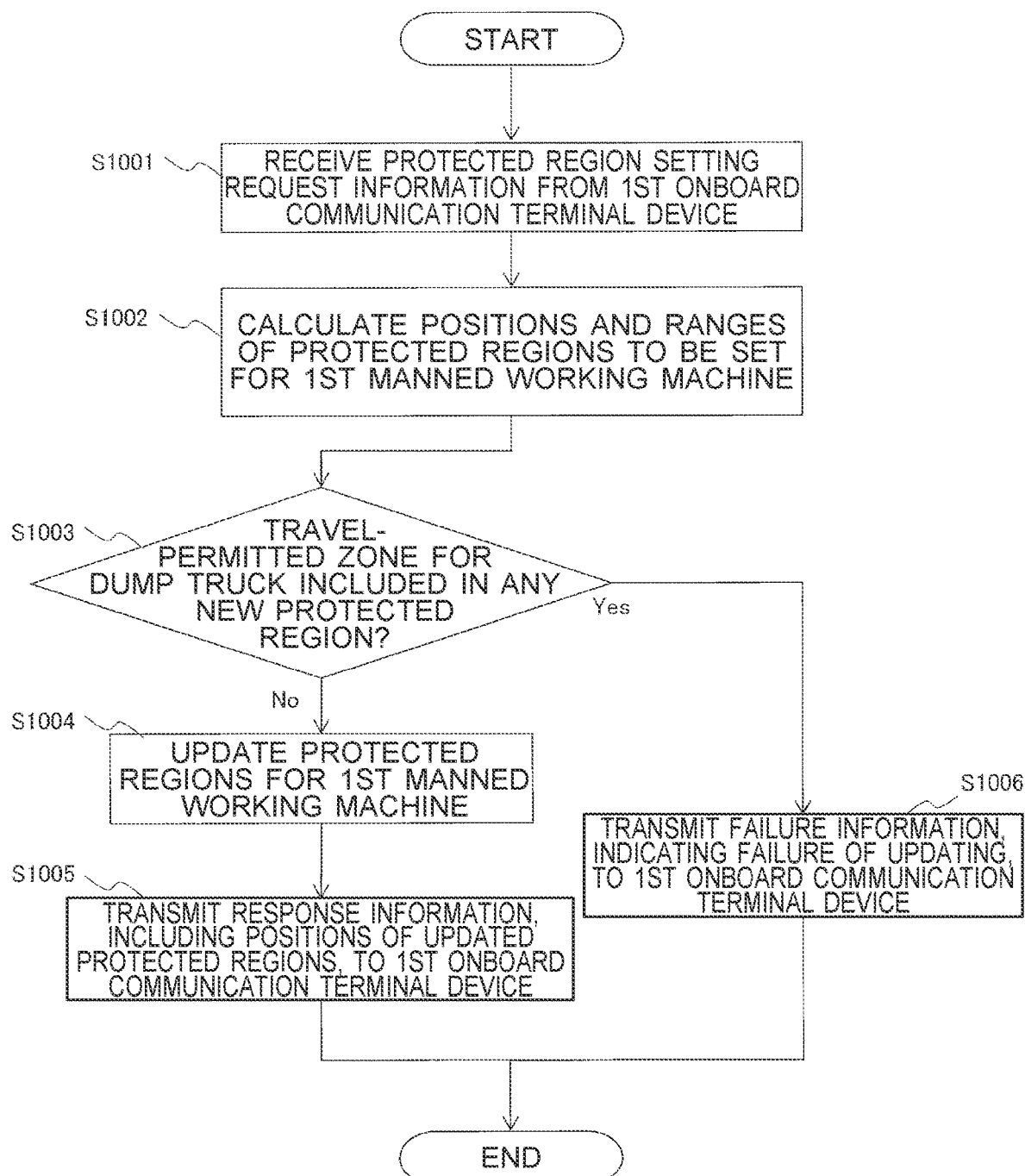
FIG. 10 is a flow chart illustrating a flow of protected region setting processing.

With reference to FIG. 10, a description will be made about details of the protected region setting processing at the traffic control device 31. FIG. 10 is a flow chart illustrating a flow of the protected region setting processing.

First, the protected region setting section 323 receives protected region setting request information from the first onboard communication terminal device 900 via the center-side communication control section 310 (S1001). In the protected region setting request information, information such as the type, position, speed and work mode of the first manned working machine 90 is contained.

Next, the protected region setting section 323 calculates, based on the information on the first manned working machine 90, the ranges of protected regions to be set for the first manned working machine 90 (S1002). As shown in FIGS. 5A and 5B, for example, the first protected region 101, second protected region 102 and third protected region 103 are set as concentric circles around the vehicle position as a center. In this case, as information on each region, the center coordinates and radius r of each region may be specified.

As mentioned above, the protected regions are not absolutely required to be circles, and may be set as oval or polygonal regions. In this case, parameters needed to designate such a shape are specified. In addition, as mentioned above, thereto additional protected regions having other attributes, such as issuing a different warning, may also be set.

Then, the protected region setting section 323 determines, with reference to the zone information stored in the zone information storage section 325, whether the travel-permitted zone already set for the dump truck 20 is to be included in any of new protected regions calculated and to be set for the first manned working machine 90 (S1003). If the travel-permitted zone for the dump truck 20 is not included (S1003/No), the protected regions for the first manned working machine 90 are set or updated and are overwritten in the protected region information storage section 326 (S1004), and response information including the updated protected region information is transmitted to the first onboard communication terminal device 900 (S1005).

If the travel-permitted zone for the dump truck 20 is included (S1003/Yes), the updating of the protected regions is not conducted, and response information to the effect that the updating of the protected regions has failed is transmitted to the first onboard communication terminal device 900 (S1006).

This embodiment, describes, as an example, the case that the traffic control of autonomous travel of the dump truck 20 is performed by setting travel-permitted zones. However, this embodiment can be also applied even to traffic control of autonomous travel without setting any travel-permitted zones.

The foregoing describes procedures for which the protected region setting section 323 of the traffic control device 31 sets protected regions for the first manned working machine 90. If these procedures are followed, the protected regions set for the first manned working machine 90 do not overlap with the travel-permitted zone set for the dump truck 20. It is, therefore, possible to evade interference between the first manned working machine 90 and the dump truck 20 as long as the first manned working machine 90 travels within the protected regions set for the first manned working machine 90.

Further, S1003 may include a determination as to whether the protected regions set for the first manned working machine 90 do not overlap not only with the travel-permitted zone for the dump truck 20, but also do not overlap with the protected regions set for another manned working machine. In this manner, as long as each manned working machine travels in the protected regions set for the own vehicle, interference between the manned working machines themselves can be evaded.

According to this embodiment, the traffic control device 31 does not conduct the updating of the first protected region 101 set on the inner side as long as the first manned working machine 90 travels in its existing region, and transmits protected region setting request information if the first manned working machine 90 has proceeded to the second protected region 102 set on the outer side. The traffic control device 31 can, therefore, update the protected regions for the first manned working machine 90 at an appropriate communication frequency without conducting excessive communications.

Further, if the first manned working machine 90 proceeds to the second protected region 102 beyond the outer boundary of the first protected region 101, the second protected region 102 is also updated.

Accordingly, there is no need to broaden the second protected region 102 itself even if the frequency of wireless communications decreases because of movements of the first working machine 90 in only the first protected region 101. As a consequence, protected regions can be set for the first manned working machine while minimizing restrictions to travel-permitted zones for autonomous traveling working machines and their operating areas.

Second Embodiment

The second embodiment is configured to reduce a risk of interference between the first manned working machine 90 (a bulldozer is taken as an example), which is working under operation by an operator under the traffic control system, and the second manned working machine 70 (a manned dump truck is taken as an example), by using the first embodiment. The second operator, who is operating the second manned working machine 70, and the first operator, who is operating the first manned working machine 90, communicate each other by wireless communications. However, mining machines led by dump trucks are giant and have many dead angles. Especially when approaching another vehicle while traveling backward, it is difficult to become aware of the existence of other vehicles. This embodiment describes configurations and operation for dealing with such a problem. Features overlapping with the configurations and the operation in the first embodiment, are omitted herein.

Figure 11:
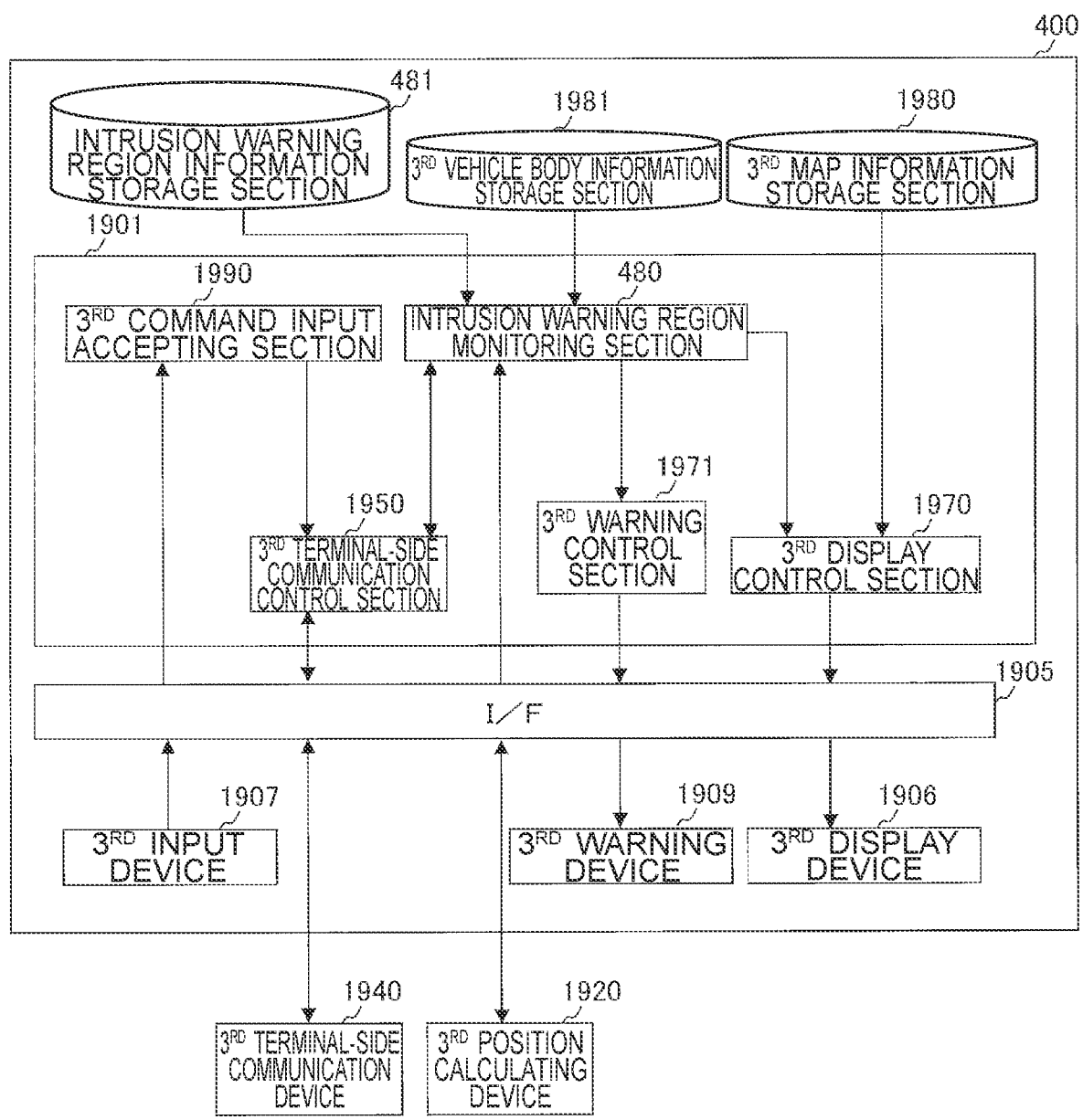
FIG. 11 is a block diagram of a second manned working machine.

Referring first to FIG. 11, the functional configuration of the second manned working machine 70 in the second embodiment will be described. FIG. 11 is a functional block diagram of the second manned working machine. As depicted in FIG. 11, a third onboard communication terminal device 400 mounted on the second manned working machine 70 is characterized in that it includes an invasion warning region monitoring section 480 and an invasion warning region information storage section 481. The remaining configurations, specifically a CPU 1901, a third vehicle body information storage section 1981, a third map information storage section 1980, an I/F 1905, a third input device 1907, a third warning device 1909, a third display device 1906, a third terminal-side communication device 1940, a third position calculating device 1920, a third command input accepting section 1990, a third terminal-side communication control section 1950, a third warning control section 1971 and a third display control section 1970 are the same as those included in the first onboard communication terminal device 900.

Figure 13:
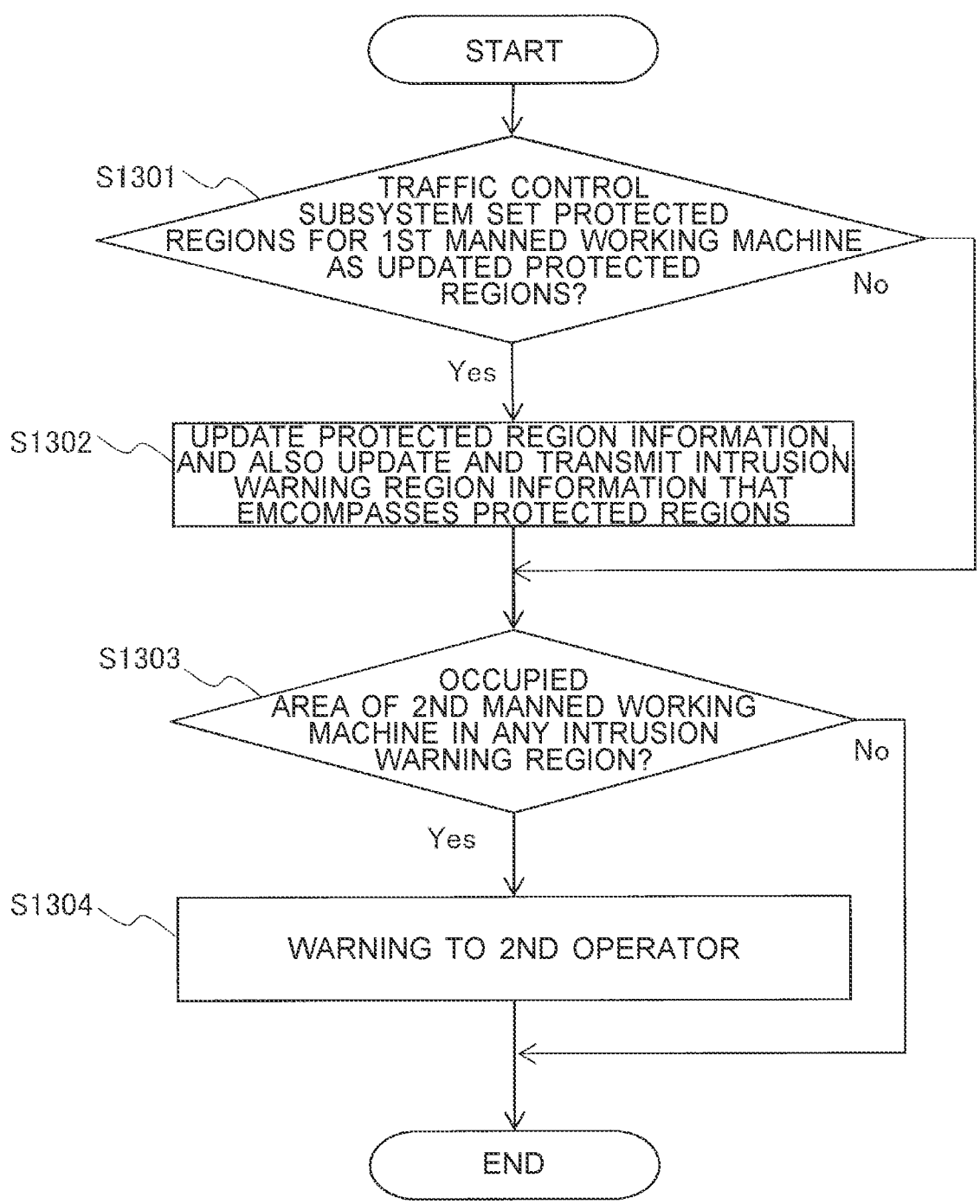
FIG. 13 is a flow chart illustrating a flow of processing of operation that issues a warning to a second operator.

Referring next to FIGS. 12 and 13, a description will be made of an operation that transmits a warning to the second operator of the second manned working machine 70 if there is a risk of intrusion of the second manned working machine 70 into the outer protected region for the first manned working machine 90. FIG. 12 is an explanatory diagram showing a positional relationship between the protected regions for the first manned working machine and the second manned working machine. FIG. 13 is a flow chart illustrating a flow of processing of operation that issues a warning to the second operator.

As shown in FIG. 12, the protected region setting section 323 sets, in this embodiment, the first protected region 101 and second protected region 102 for the first manned working machine 90 as well as the intrusion warning region 104 that encompasses the first protected region 101 and second protected region 102 and also includes a region on a side outer than the second protected region 102.

The intrusion warning region 104 has region information to be commonly shared by all the vehicles controlled by the traffic control device 31, and is a region for issuing a warning to the operator of the second manned working machine 70 or another manned working machine (not shown) if the second manned working machine 70 or the another manned working machine has intruded into the intrusion warning region 104.

As illustrated in FIG. 13, if the traffic control device 13 sets protected regions 101,102 as updated protected regions for either one of the manned working machines, for example, the first manned working machine 90 (S1301/Yes), the protected region setting section 323 also updates the intrusion warning region 104 that encompasses the protected regions 101,102, and transmits intrusion warning region information, which indicates the position of the intrusion warning region 104, as a broadcast message (S1302).

The third onboard communication terminal device 400 of the second manned working machine 70 receives the updated intrusion warning region information, and stores it in the intrusion warning region information storage section 481.

The intrusion warning region monitoring section 480 of the second manned working machine 70 calculates, based on the vehicle body information indicating the size and the like of the vehicle body of the own vehicle stored in the third vehicle body information storage section 1981, the size of the occupied area of the vehicle body of the own vehicle and the positions of the at least two representative points in the occupied area. The intrusion warning region monitoring section 480 then determines whether the occupied area of the vehicle body of the second manned working machine 70 is located in the intrusion warning region 104 set for either one of the manned working machines, for example, the first manned working machine 90 and stored in the intrusion warning region information storage section 481 (S1303).

If the intrusion warning region monitoring section 480 determines that the occupied area of the vehicle body of the second manned working machine 70 is included in the intrusion warning region 104 for either one of the manned working machines, for example, the first manned working machine 90 (S1303/Yes), the third warning control section 1971 actuates the third warning device 1909 so that a warning is issued to the second operator (S1304).

If the occupied area of the vehicle body of the second manned working machine 70 is determined not to be included in any intrusion warning region 104 (S1303/No), nothing is executed and the processing is ended.

The foregoing is the processing through which, if there is a risk that the second manned working machine 70 may proceed to the second protected region for the first manned working machine 90, a warning is issued to the second operator of the second manned working machine 70 at a time point that the second manned working machine 70 has intruded into the intrusion warning region 104 set on the side outer than the second protected region. If the first operator of the first manned working machine 90 ensures to operate, based on such configuration and operation, the first manned working machine 90 so that it does not run off the second protected region, a warning is issued to the second operator of the second manned working machine 70 upon intrusion of the second manned working machine 70 into the intrusion warning region 104 set on the side outer than the second protected region, whereby, before the second manned working machine 70 proceeds to the protected regions in which the first manned working machine 90 is traveling, the second operator becomes aware of the existence of the first manned working machine 90 and the risk of interference can be reduced.

In this embodiment, it is not described to the effect that protected regions are also set for the second manned working machine 70. However, similar protected regions may also be set for the second manned working machine 70. The traffic control device 31 may set protected regions for plural vehicles without any overlap. In this case, the risk of interference between an own vehicle and the other vehicles is reduced because no intrusion of the other vehicles into the protected regions for the own vehicle occurs at all as long as the operators of the other vehicles perform traveling of the other vehicles so that the other vehicles do not run off their own protected regions. As an alternative, the traffic control device 31 may set the protected regions for the plural vehicles with an overlap there between. In this case, the risk of interference between an own vehicle and another vehicle can be reduced by also setting an intrusion warning region 104 for each vehicle as in this embodiment and issuing a warning to the operator of the another vehicle if the another vehicle intrudes the intrusion warning region 104 for the own vehicle.

The above-described embodiments are merely illustrative of the present invention, and are not intended to restrict the present invention. Various changes and modifications are feasible for those skilled in the art within the scope of technical ideas disclosed in this description.

For example, in the foregoing, it is configured to transmit failure information, which indicates that no protected regions have been successfully set for the first manned working machine 90, if the protected regions to be allotted to the first manned working machine 90 overlap the travel-permitted zone for the dump truck 20 or the protected regions set for another manned working machine. However, in view of the travel-permitted zone for the dump truck 20 and the protected regions set for the another manned working machine, the protected regions to be allotted to the first manned working machine 90 may be changed to avoid an overlap with them, for example, by reducing or partially cutting off the protected regions to be allotted. In this manner, as long as the first manned working machine 90 travels within the protected regions set for the first manned working machine 90, it is possible to evade interference between the dump truck 20 and the first manned working machine 90 and interference between the manned working machines themselves, and al so to allow them to continuously travel to other places by updating the protected regions to a possible extent.

The frequency of communications to be needed following movements of the first manned working machine 90 can be appropriately adjusted by determining the shapes of the protected regions based on the type, position, speed and work mode of the first manned working machine 90.

The protected region setting section 323 may be mounted in the onboard communication terminal device of each vehicle operating in a mine, protected regions for the own vehicle may be set by the onboard communication terminal device mounted on the own vehicle, and the results of the setting may be transmitted to the traffic control device 31. Further, the traffic control device 31 may set a travel-permitted zone for the own vehicle so that it does not overlap the protected regions set for each vehicle. Furthermore, the protected regions for the own vehicle may be notified to another vehicle, which has come close to the own vehicle, by transmitting the protected regions for the own vehicle as a broadcast message via vehicle-to-vehicle communication. As a consequence, the communication to notify the protected regions for the own vehicle to the another vehicle can avoid tightening the wireless communication network 40 for use in autonomous traveling because communication lines for vehicle-to-vehicle communications and communication lines for use in autonomous traveling (between the autonomous traveling working machines and the traffic control device 31) are different.

Figure 14:
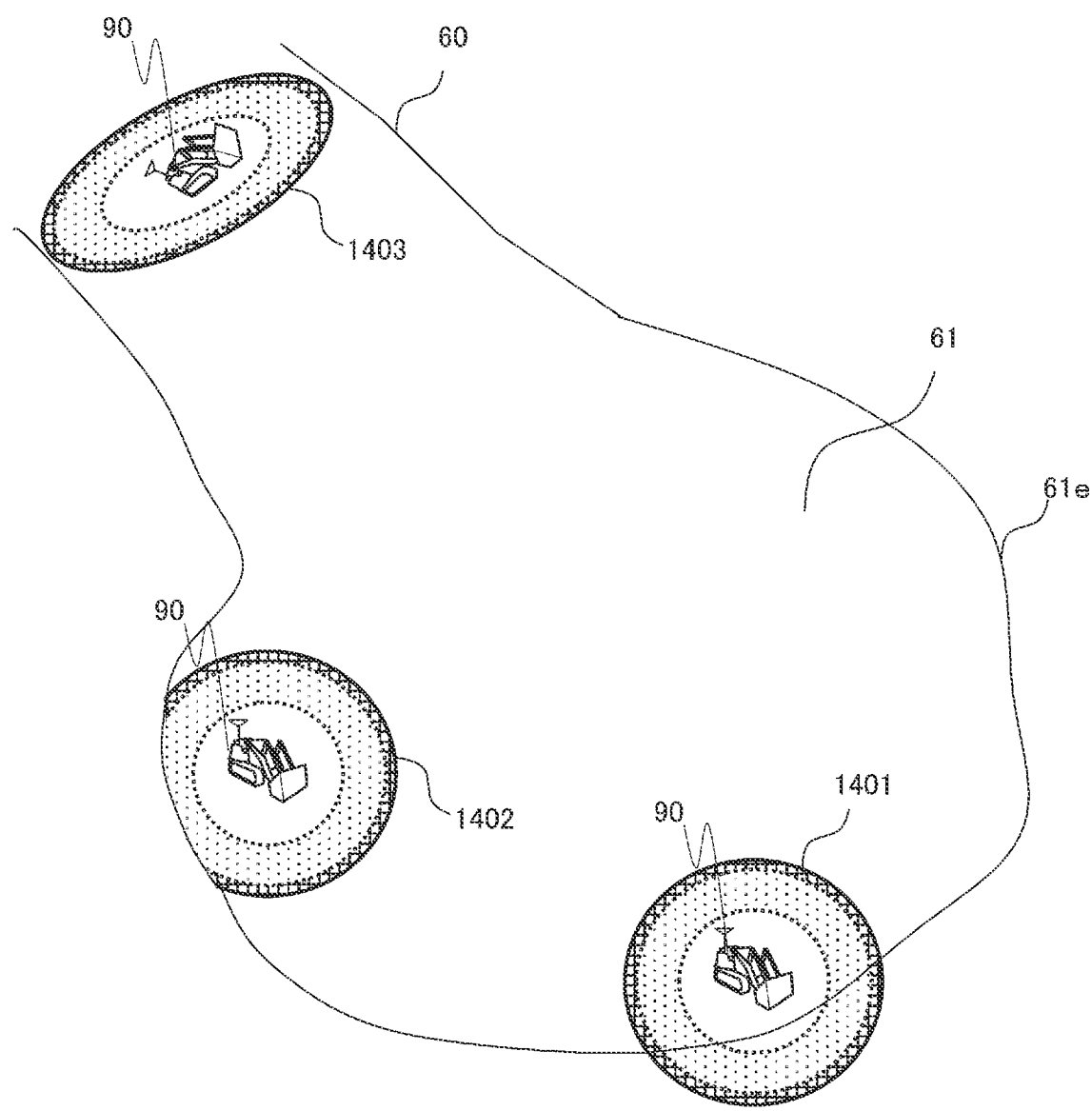
FIG. 14 is a diagram illustrating illustrative shapes of protected regions.

The shape of each protected region is not limited to the foregoing. As illustrated in FIG. 14, for example, a protected region 1401 may be set extending beyond a boundary 61e of the dumping site 61 (which is merely an example of the work site). Like a protected region 1402, a protected region may be set only inside the boundary 61e of the work site. In this mode, a protected region which includes a region only inside the boundary 61e can be set by storing map information, which indicates the position information on the boundary of the dumping site 61, beforehand in the traffic control map information storage section 324, provisionally setting the protected region 1402 in a basic shape such as a circular shape at the protected region setting section 323 and then comparing the basic shape with position information on the boundary 61e, the position information being stored in the map information, and cutting off a part of the protected region, the part running off the boundary 61e. As appreciated from the foregoing, the second protected region may be set along a part of the periphery of the first protected region rather than its entire periphery.

A protected region may also be set in a shape extending along a working direction of a manned working machine. For example, a protected region 1403 of an oval shape, which is longer in the width direction of the haul road 60 than in the proceeding direction of the manned working machine, may be set.

LEGENDS

1 Vehicle control system
20 Dump truck
31 Traffic control device

The invention claimed is:

1. A traffic control device comprises a computer connected to a center-side communication device;
the center-side communication device being a wireless communication device that conducts transmission and reception of wireless communication information with each of a first onboard communication terminal device mounted on a first manned working machine, which travels under operation by a first operator, and a second onboard communication terminal device mounted on an autonomous traveling working machine which autonomously travels according to a control command from the traffic control device, that receives, from the first onboard communication terminal device, information on a protected region setting request, which requests setting of a protected region for the first manned working machine to avoid interference with the autonomous traveling working machine, and information on a position of the first manned working machine, and that transmits the control command to the second onboard communication terminal device;
the traffic control device being provided with:
a traffic control map information storage section that stores information on a map of a haul road on which the autonomous traveling working machine and the first manned working machine travel, and
a protected region setting section that, when the center-side communication device receives the protected region setting request information, sets, as a protected region for the first manned working machine, a region, in which the position of the first manned working machine is included and into which intrusion of the autonomous traveling working machine is prohibited, based on the map information and the position information received from the first onboard communication terminal device;
the protected region including a first protected region, which includes the position of the first manned working machine, and a second protected region, which is set along a periphery of the first protected region;
the first protected region being a region in which the first onboard communication terminal device does not transmit new protected region setting request information;
the second protected region being a region in which the first onboard communication terminal device transmits new protected region setting request information;
the protected region setting section being configured to output response information, which indicates positions of the first and second protected regions set responsive to the protected region setting request information, to the center-side communication device; and
the response information being transmitted to the first onboard communication terminal device via the center-side communication device.

2. The traffic control device according to claim 1, wherein:
the protected region setting request information contains at least one of vehicle type, speed, and work mode of the first manned working machine;
the traffic control device further comprises a protected region information storage section that stores protected region information which defines shapes of the first and second protected regions;
the protected region information is information in which at least radii or widths of the first and second protected regions or both are correlated to at least one of vehicle type, speed, and work mode of the first manned working machine; and
the protected region setting section refers to the protected region information, and sets, as the first and second protected regions, regions having the at least radii or widths of the first and second protected regions or both, which correspond to at least one of vehicle type, speed, and work mode of the first manned working machine as contained in the protected region setting request information, as the first and second protected regions around the position of the first manned working machine as a center.

3. The traffic control device according to claim 1, wherein:
the protected region setting section further sets, as the protected region, a third protected region including a region along an outer periphery of the second protected region; and
the third protected region is a region in which, if the first manned working machine proceeds to the third protected region, a warning is issued to the first operator to indicate that there is a possibility for the first manned working machine to depart to an outside of the second protected region set for the first manned working machine.

4. The traffic control device according to claim 1, wherein:
the center-side communication device receives information on a position of the second manned working machine from a third onboard communication terminal device mounted on the second manned working machine that travels under operation by a second operator;
the protected region setting section further sets, based on the map information and the position information on the second manned working machine, an intrusion warning region, which includes a region along an outer periphery of the second protected region and in which, if the second manned working machine intrudes into the intrusion warning region, a warning indicating a possibility of intrusion into the first protected region and second protected region set for the first manned working machine is issued to the second operator, and outputs intrusion warning region information, which indicates a position of the intrusion warning region, to the center-side communication device; and the intrusion warning region information is transmitted to the third onboard communication terminal device via the center-side communication device.

5. An onboard communication terminal device comprising a computer mounted on a manned working machine that travels under operation by an operator, the computer being connected to each of a terminal-side communication device, which is mounted on the manned working machine and includes a wireless communication device, and a GPS mounted on the manned working machine;

the GPS being configured to calculate a position of the manned working machine and to output position information;

the terminal-side communication device being connected to a traffic control device, which performs traffic control of an autonomous traveling working machine, via wireless communication network, and being configured to transmit information on a protected region setting request, which requests setting of a protected region for the manned working machine to avoid interference with the autonomous traveling working machine, and the position information to the traffic control device, and to receive response information, which indicates a position of the protected region as set by the traffic control device, from the traffic control device;

the onboard communication terminal device comprising:

a vehicle body information storage section that stores vehicle body information indicating a size of vehicle body of the manned working machine, a protected region monitoring section that compares the position of the protected region as indicated by the response information and the position information as acquired from the GPS and monitors whether the manned working machine has departed from the protected region, and a protected region setting request information generating section that based on results of monitoring by the protected region monitoring section, generates information on a protected region setting request for requesting setting of a new protected region and outputs the protected region setting request information to the terminal-side communication device;

the protected region including a first protected region, which includes the position of the manned working machine, and a second protected region, which has been set along an outer periphery of the first protected region;

the first protected region being a region in which the onboard communication terminal device does not transmit new protected region setting request information;

the second protected region being a region in which the onboard communication terminal device transmits new protected region setting request information;

the protected region monitoring section including:

an occupied area calculating section that based on the position information and the vehicle body information, calculates positions of at least two representative points in an occupied area that the vehicle body of the manned working machine occupies on a plane formed by projecting the vehicle body of the manned working machine on a ground surface, and a comparison section that compares the positions of the representative points with each of a position of the first protected region and a position of the second protected region; and the protected region setting request information generating section being configured so that based on results of the comparison by the comparison section, new protected region setting request information is not generated if the occupied area is in the first protected region but new protected region setting request information is generated if the occupied area is in the second protected region.

6. The onboard communication terminal device according to claim 5, wherein:

the protected region monitoring section sets, as the at least two representative points, a first representative point on a front section of the manned working machine and a second representative point on a rear section of the manned working machine; and the comparison section determines that the occupied area has departed at a part thereof from the first protected region or second protected region if only one of the first representative point and second representative point departs from the first protected region or the second protected region.

7. The onboard communication terminal device according to claim 6, wherein:

the comparison section determines that the occupied area has departed at an entire part thereof from the first protected region or second protected region if the first representative point and second representative point both depart from the first protected region or the second protected region.

* * * * *